United States Patent
Soles et al.

(10) Patent No.: US 11,475,185 B2
(45) Date of Patent: Oct. 18, 2022

(54) INVERSE DESIGN MACHINE AND MAKING A DESIGNER IMPACT-MITIGATING ARCHITECTURED ISOTROPIC STRUCTURE

(71) Applicant: Government of the United States of America, as represented by the Secretary of Commerce, Gaithersburg, MD (US)

(72) Inventors: Christopher L. Soles, Boyds, MD (US); Edwin Pak-Nin Chan, Rockville, MD (US); Irmgard Bischofberger, Chicago, IL (US); Sidney Robert Nagel, Chicago, IL (US); Heinrich Martin Jaeger, Chicago, IL (US); Juan Jose de Pablo, Chicago, IL (US); Nidhi Pashine, Chicago, IL (US); Daniel Robert Reid, Chicago, IL (US); Carl Goodrich, Chicago, IL (US); Andrea Jo-Wei Liu, Chicago, IL (US); Daniel Hexner, Chicago, IL (US); Marcos A. Reyes-Martinez, Washington, DC (US); Meng Shen, Los Angeles, CA (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 266 days.

(21) Appl. No.: 16/837,504

(22) Filed: Apr. 1, 2020

(65) Prior Publication Data

US 2020/0320235 A1 Oct. 8, 2020

Related U.S. Application Data

(60) Provisional application No. 62/827,987, filed on Apr. 2, 2019.

(51) Int. Cl.
*G06F 30/23* (2020.01)
*G06F 30/17* (2020.01)
(Continued)

(52) U.S. Cl.
CPC ............. *G06F 30/23* (2020.01); *G06F 30/17* (2020.01); *G06F 2101/02* (2013.01); *G06F 2113/10* (2020.01); *G06F 2119/14* (2020.01)

(58) Field of Classification Search
CPC .......... G06F 30/00; G06F 30/23; G06F 30/17; G06F 30/10; G06F 30/20; G06F 2101/02;
(Continued)

(56) References Cited

PUBLICATIONS

Raza, Irfan Mohammad Hussain, "Addictive Manufacturing of Locally Resonant Metamaterials", Apr. 2017, Department of Aeronautics, Imperial College London. (Year: 2017).*

(Continued)

*Primary Examiner* — Cedric Johnson
(74) *Attorney, Agent, or Firm* — Office of Chief Counsel for National Institute of Standards and Technology

(57) ABSTRACT

An inverse design machine for making a manufactured article that includes a designer Impact-mitigating architectured isotropic structure includes: an input unit that receives a primary structure; a primary structure analyzer that receives the primary structure from the input unit and determines primary properties of the primary structure; a structure adjuster that receives the primary properties from the primary structure analyzer, receives impact-mitigating properties from a structural property manager, and produces the designer Impact-mitigating architectured isotropic structure from the impact-mitigating properties; and the structural property manager that provides the impact-mitigating properties to the structure adjuster.

14 Claims, 19 Drawing Sheets

(51) Int. Cl.
    *G06F 113/10* (2020.01)
    *G06F 119/14* (2020.01)
(58) Field of Classification Search
    CPC ............. G06F 2113/10; G06F 2119/14; G06F 2111/10
    USPC .......................................................... 703/2
    See application file for complete search history.

(56) References Cited

PUBLICATIONS

Correa, Dixon Malcolm, "Design and Evaluation of Negative Stiffness Honeycombs for Recoverable Shock Isolation", May 2015, Master of Science in Engineering, University of Texas at Austin. (Year: 2015).*

Reid, Daniel R. et al., "Auxetic Metamaterials from Disordered Networks", Jan. 2018, PNAS. (Year: 2018).*

Rocks, J.W., et al., "Designing allostery-inspired response in mechanical networks", PNAS, 2017, p. 2520-2525, vol. 114 No. 10.

Reid, D.R., et al., "Auxetic metamaterials from disordered networks", PNAS, 2018, p. E1384-E1390, DOI: www.pnas.org/cgi/doi/10.1073/pnas.1717442115.

Reid, D.R., et al., "Ideal isotropic auxetic networks from random networks", Soft Matter, 2019, p. 8084-8091, vol. 15.

Hexner, D., et al., "Role of local response in manipulating the elastic properties of disordered solids by bond removal", Soft Matter, 2018, p. 312-318, vol. 14.

\* cited by examiner

INVERSE DESIGN MACHINE AND MAKING A DESIGNER IMPACT-MITIGATING ARCHITECTURED ISOTROPIC STRUCTURE

CROSS REFERENCE TO RELATED APPLICATIONS

The application claims priority to U.S. Provisional Patent Application Ser. No. 62/827,987 filed Apr. 2, 2019, the disclosures of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce, and The Government has certain rights in the invention. Licensing inquiries may be directed to the Technology Partnerships Office, NIST, Gaithersburg, Md., 99; voice (301)-975-2573; email tpo@nist.gov.

BRIEF DESCRIPTION

Disclosed is a method of operating a manufacturing machine for manufactured article with the aid of an inverse design machine, the method comprising: providing the inverse design machine with a primary structure for a manufactured article and with impact-mitigating properties for the manufacturing machine, the primary structure comprising a plurality of structural members arranged in the primary structure that collectively provide primary properties to the manufactured article and that comprise a primary shear modulus and a primary bulk modulus that provide a primary torsional rigidity and a primary compression rigidity of the manufactured article being made by the manufactured article; and the impact-mitigating properties comprising an impact-mitigating shear modulus and an impact-mitigating bulk modulus that provide an impact-mitigating torsional rigidity and an impact-mitigating compression rigidity for the manufactured article being made by the manufacturing machine, such that the impact-mitigating properties provide the manufactured article with greater structural impact mitigation than the primary properties; receiving the primary structure from a primary designer; initiating a point-by-point analysis on the primary structure in the inverse design machine; determining the primary properties of the primary structure with a primary structure analyzer of the inverse design machine; receiving, by a structure adjuster of the inverse design machine, the primary properties from the primary structure analyzer and the impact-mitigating properties from a structural property manager of the inverse design machine; adjusting, by the structure adjuster, the structural members in the primary structure until the structural members collectively conform to the impact-mitigating properties such that the primary structure is structurally modified into a designer impact-mitigating architectured isotropic structure that comprises the impact-mitigating properties; controlling the operation manufacturing machine in accordance with the designer impact-mitigating architectured isotropic structure by the inverse design machine; and forming, by the manufacturing machine under control of the designer impact-mitigating architectured isotropic structure from the inverse design machine, the manufactured article that comprises the designer impact-mitigating architectured isotropic structure instead of the primary structure.

Disclosed is a method of operating a manufacturing machine for manufactured article with the aid of an inverse design machine, the method comprising: providing the inverse design machine with a primary structure for a manufactured article and with impact-mitigating properties for the manufacturing machine, the primary structure comprising a plurality of structural members arranged in the primary structure that collectively provide primary properties to the manufactured article and that comprise a primary shear modulus and a primary bulk modulus that provide a primary torsional rigidity and a primary compression rigidity of the manufactured article being made by the manufactured article; and the impact-mitigating properties comprising an impact-mitigating shear modulus and an impact-mitigating bulk modulus that provide an impact-mitigating torsional rigidity and an impact-mitigating compression rigidity for the manufactured article being made by the manufacturing machine, such that the impact-mitigating properties provide the manufactured article with greater structural impact mitigation than the primary properties; receiving the primary structure from a primary designer; initiating a point-by-point analysis on the primary structure in the inverse design machine; determining the primary properties of the primary structure with a primary structure analyzer of the inverse design machine; receiving, by a structure adjuster of the inverse design machine, the primary properties from the primary structure analyzer and the impact-mitigating properties from a structural property manager of the inverse design machine; adjusting, by the structure adjuster, the structural members in the primary structure until the structural members collectively conform to the impact-mitigating properties such that the primary structure is structurally modified into a designer impact-mitigating architectured isotropic structure that comprises the impact-mitigating properties; controlling the operation manufacturing machine in accordance with the designer impact-mitigating architectured isotropic structure by the inverse design machine; initiating formation of the manufactured article by controlling a position of a print head of the manufacturing machine under control of the inverse design machine in accord with the designer impact-mitigating architectured isotropic structure; constantly determining the position of the print head of the manufacturing machine during formation of the manufactured article; constantly providing the inverse design machine with the position of the print head; repetitively performing in the inverse design machine, at frequent intervals during formation of the manufactured article, corrections to the position of the printer head based on designer impact-mitigating architectured isotropic structure and to monitor completion of formation of the manufactured article by the manufacturing machine communicating corrections to the position of the printer head from the inverse design machine to the manufacturing machine; correcting the position of the printer head by the manufacturing machine based on the corrections received from the inverse design machine; and completing formation, by the manufacturing machine under control of the designer impact-mitigating architectured isotropic structure from the inverse design machine, the manufactured article that comprises the designer impact-mitigating architectured isotropic structure instead of the primary structure.

Disclosed is an inverse design machine for making an manufactured article that comprises a designer impact-mitigating architectured isotropic structure, the inverse design machine comprises: an input unit that receives a primary structure; a primary structure analyzer in communication with the input unit and that receives the primary structure from the input unit and determines primary properties of the primary structure from the primary structure; a structure adjuster in communication with the primary structure analyzer and that receives the primary properties from the primary structure analyzer, receives impact-mitigating properties from a structural property manager, and produces the designer impact-mitigating architectured isotropic structure for the manufactured article from the primary properties and the impact-mitigating properties; and the structural property manager in communication with the structure adjuster and that provides the impact-mitigating properties to the structure adjuster.

BRIEF DESCRIPTION OF THE DRAWINGS

The following description cannot be considered limiting in any way. With reference to the accompanying drawings, like elements are numbered alike.

The dashed curves are for $$\frac{k_\theta}{k_b} = 0.01;$$

The dotted curves are for $$\frac{k_\theta}{k_b} = 0.1.$$

Figure 10:
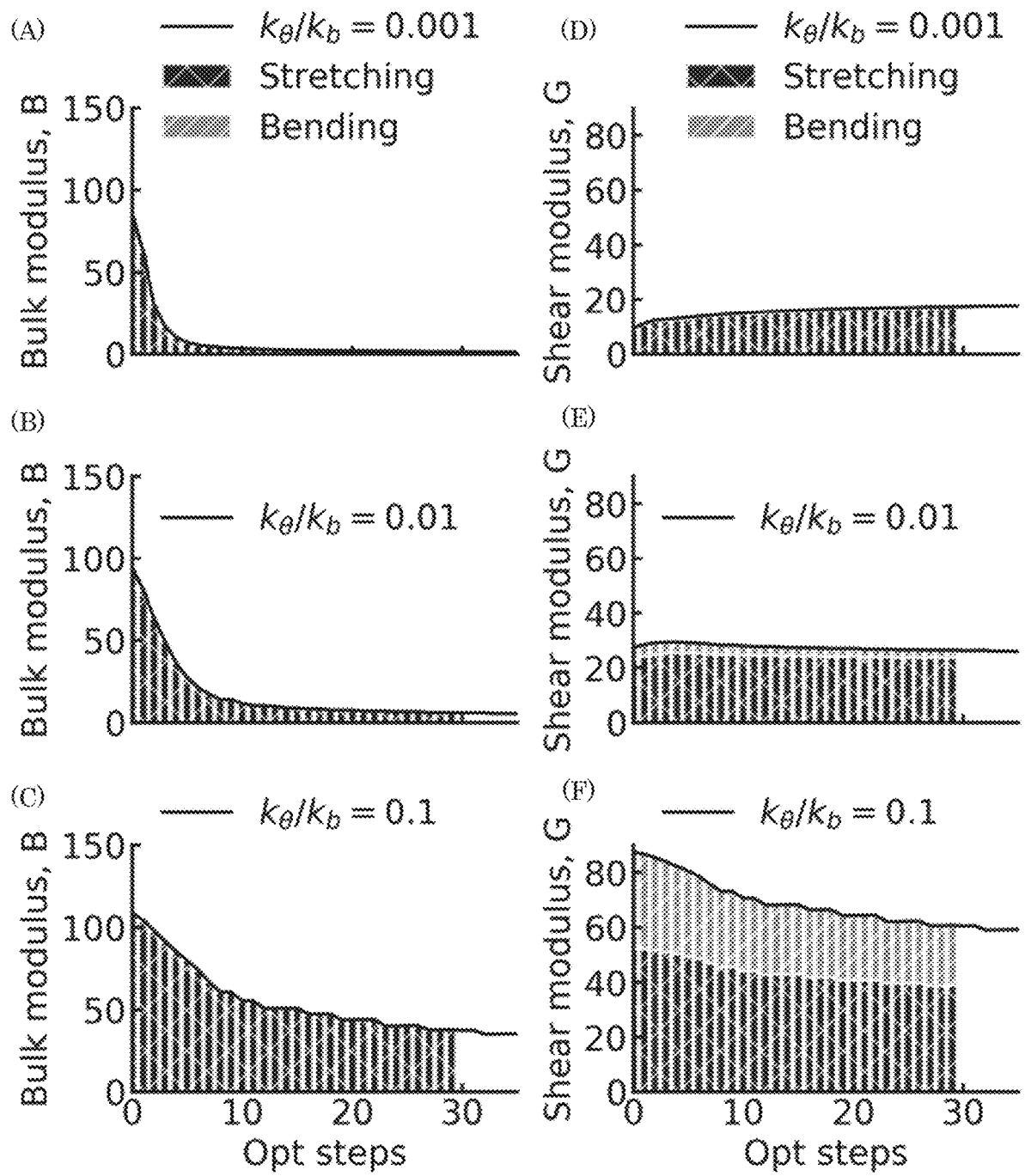

The black curves in B) show bulk modulus, and the red curves in B) show shear modulus. resistance, the higher is the plateaued value of the bulk modulus after optimization, which may originate from the nonaffine nature of the shear deformation in disordered networks;

FIG. 10 shows decomposition of bulk modulus (A), B) and C)) and shear modulus (D), E) and F)) into bond stretching and angle bending resistance at $$\frac{k_\theta}{k_b} = 0.001 \text{ (A) and D))}, \frac{k_\theta}{k_b} = 0.01 \text{ (B) and E))} \text{ and } \frac{k_\theta}{k_b} = 0.1 \text{ (C) and F))};$$

Figure 11:
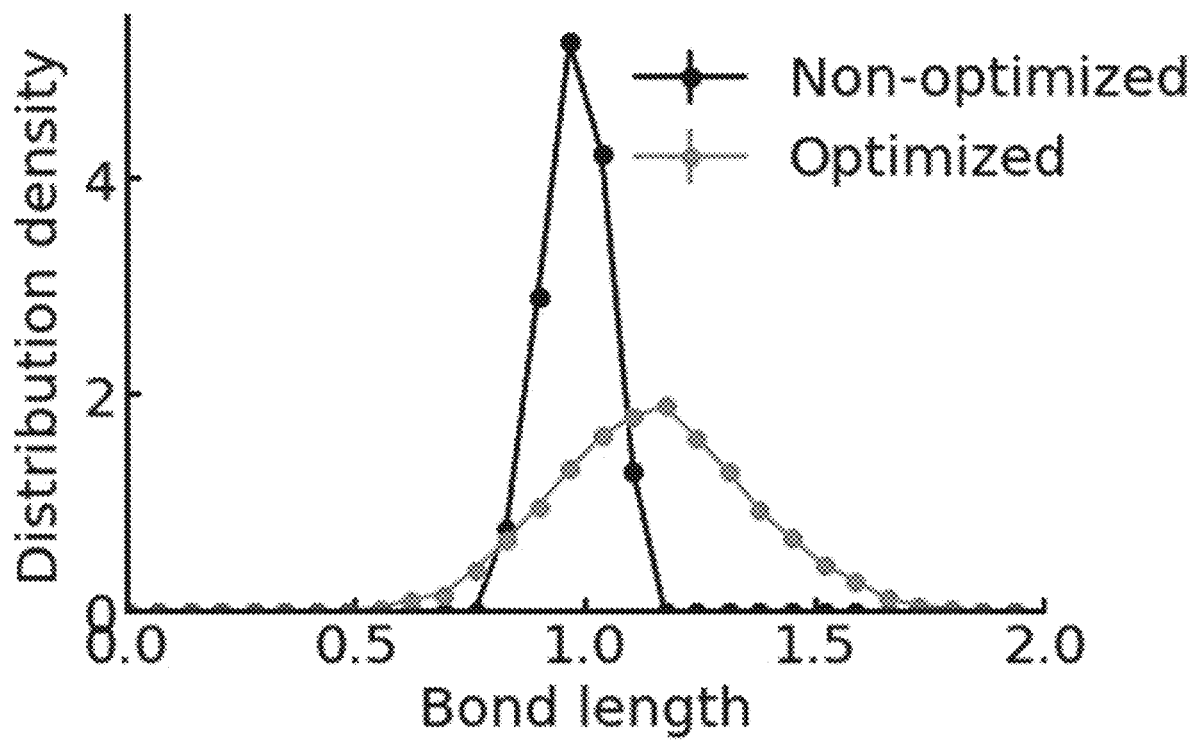
Figure 12:
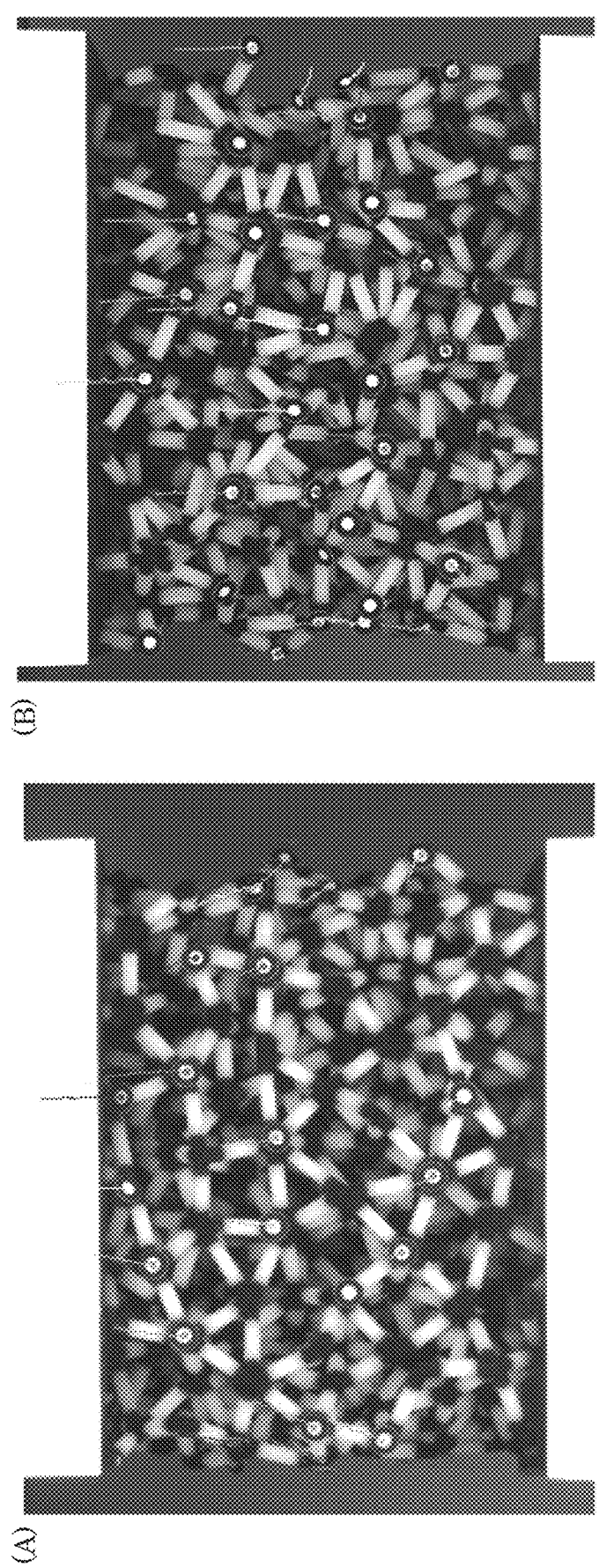
Figure 13:
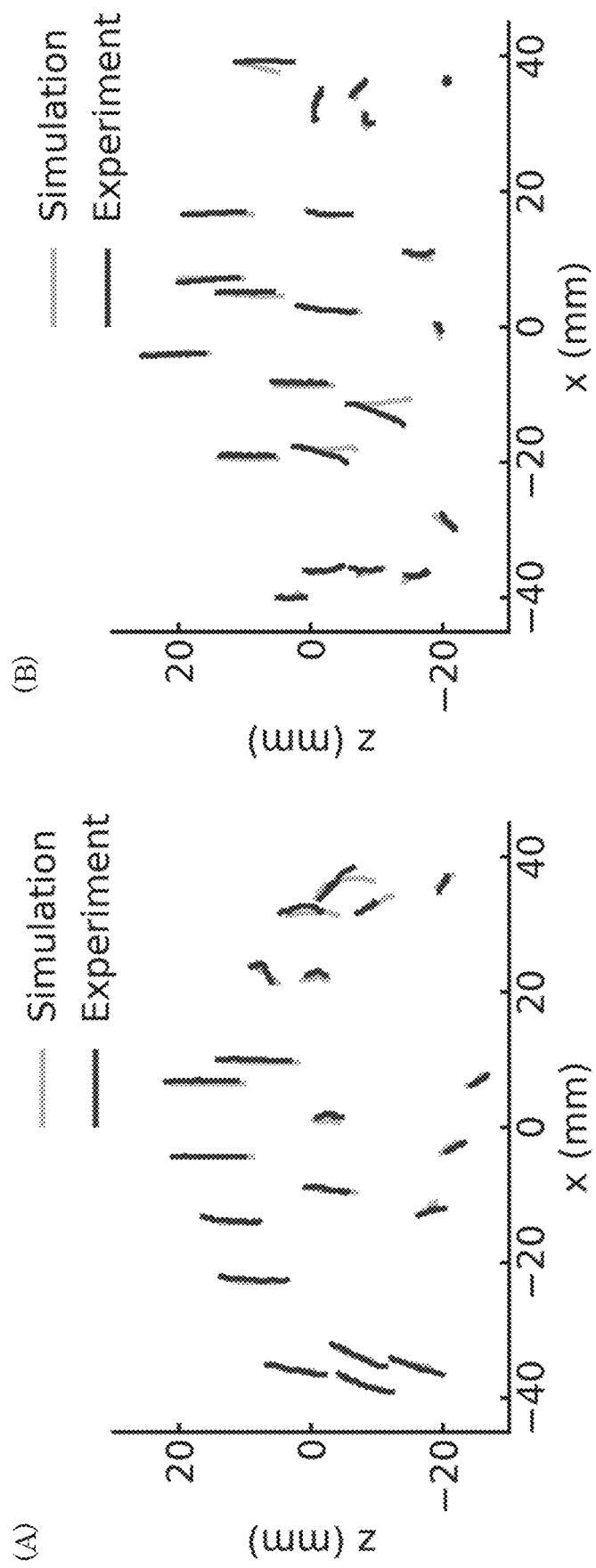
Figure 14:
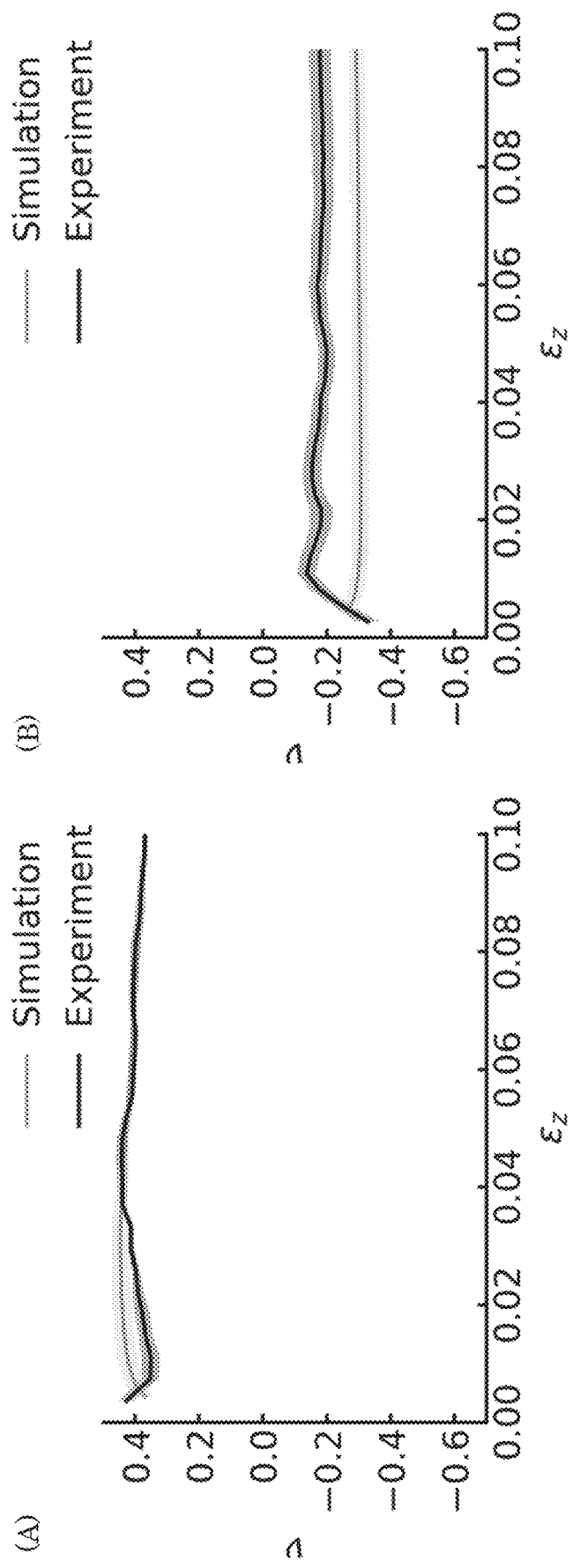
Figure 15:
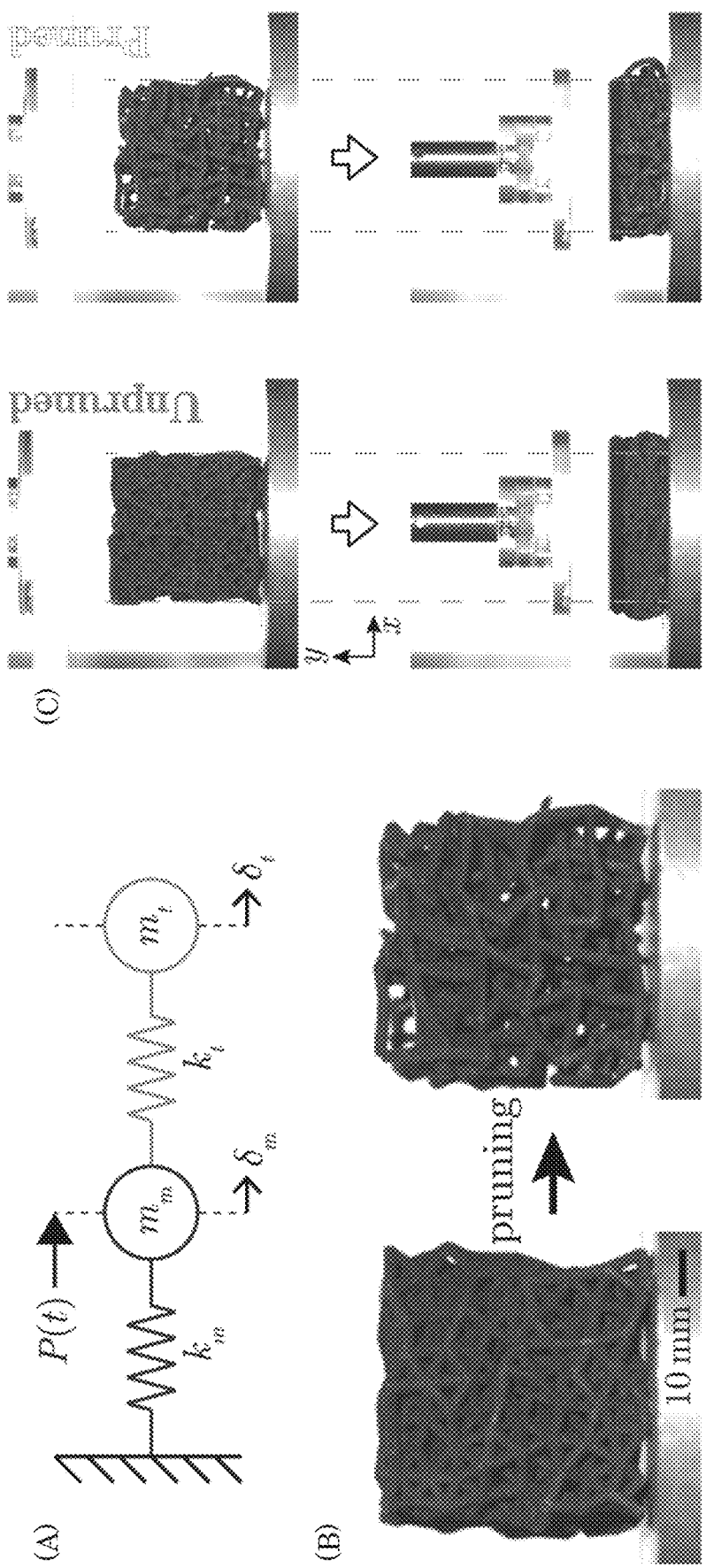
Figure 16:
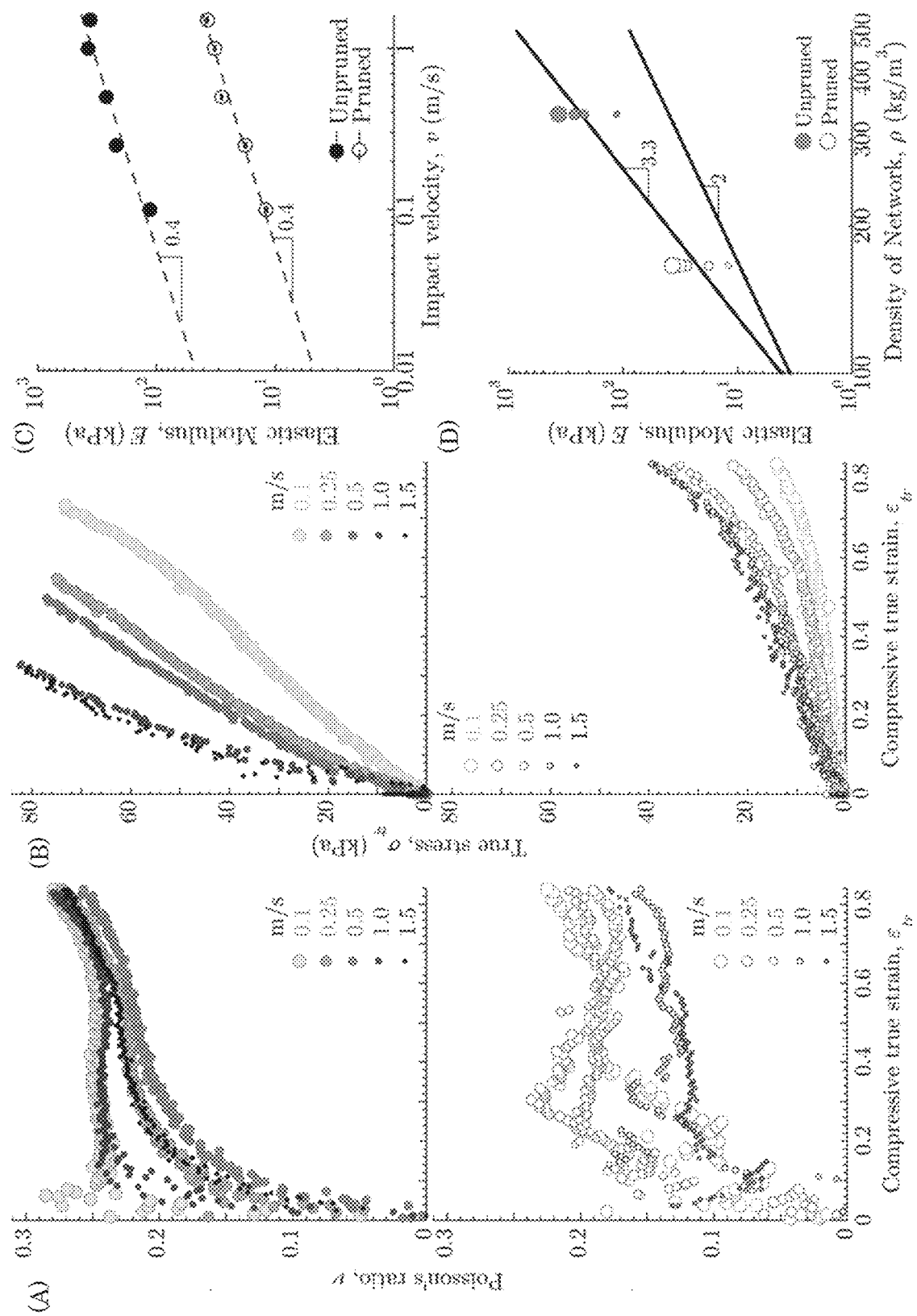
Figure 17:
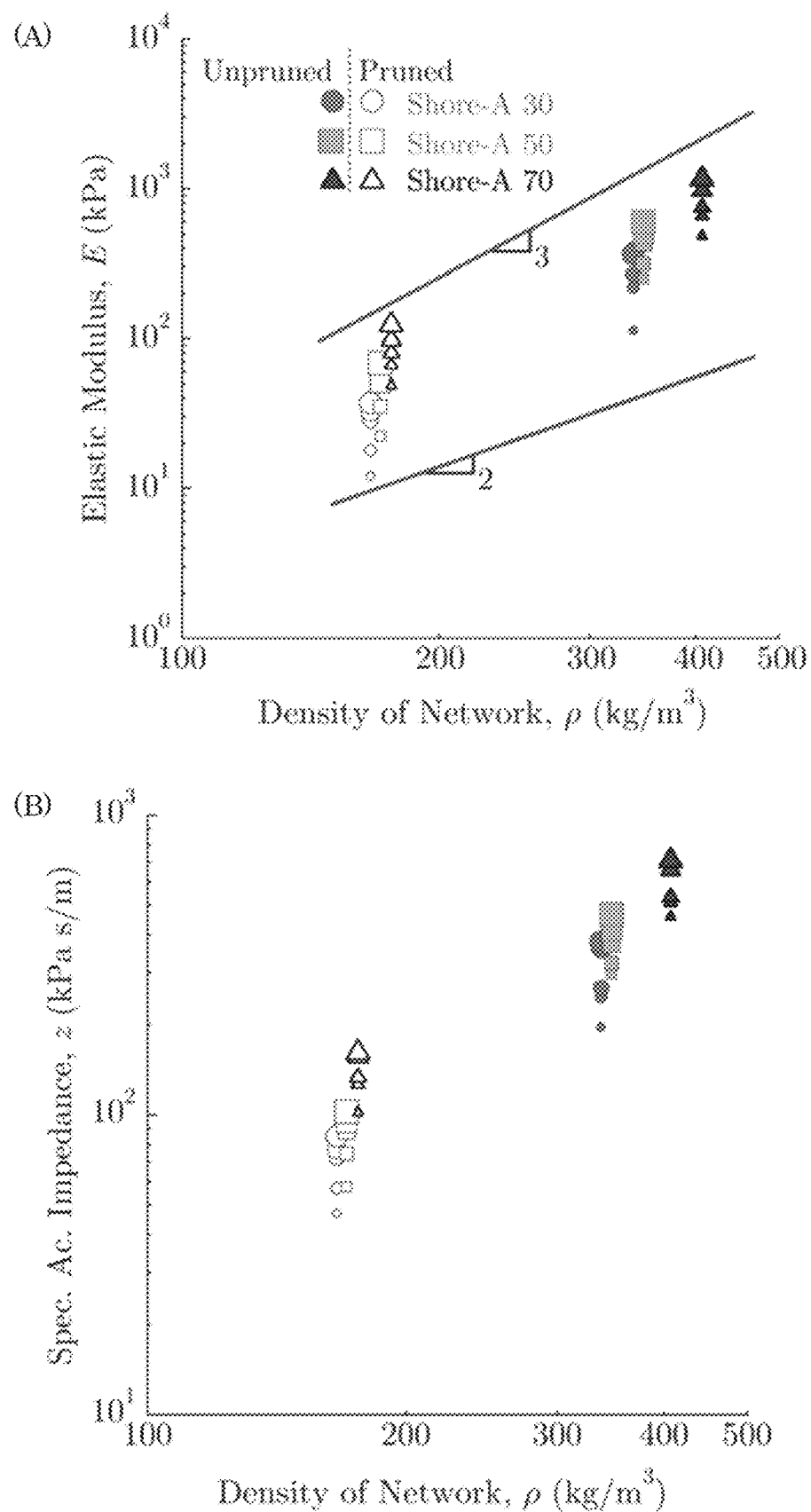
Figure 18:
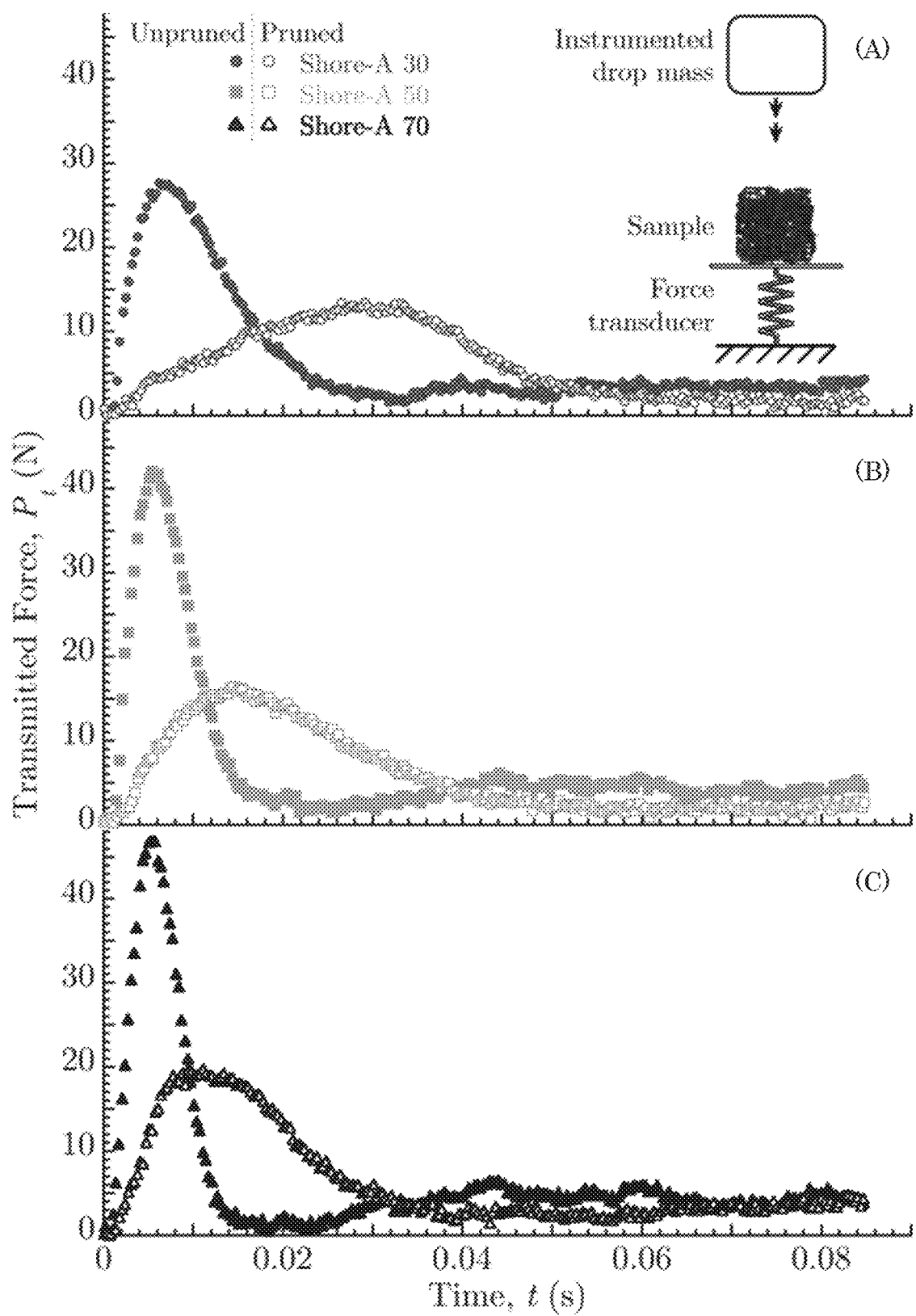
Figure 19:
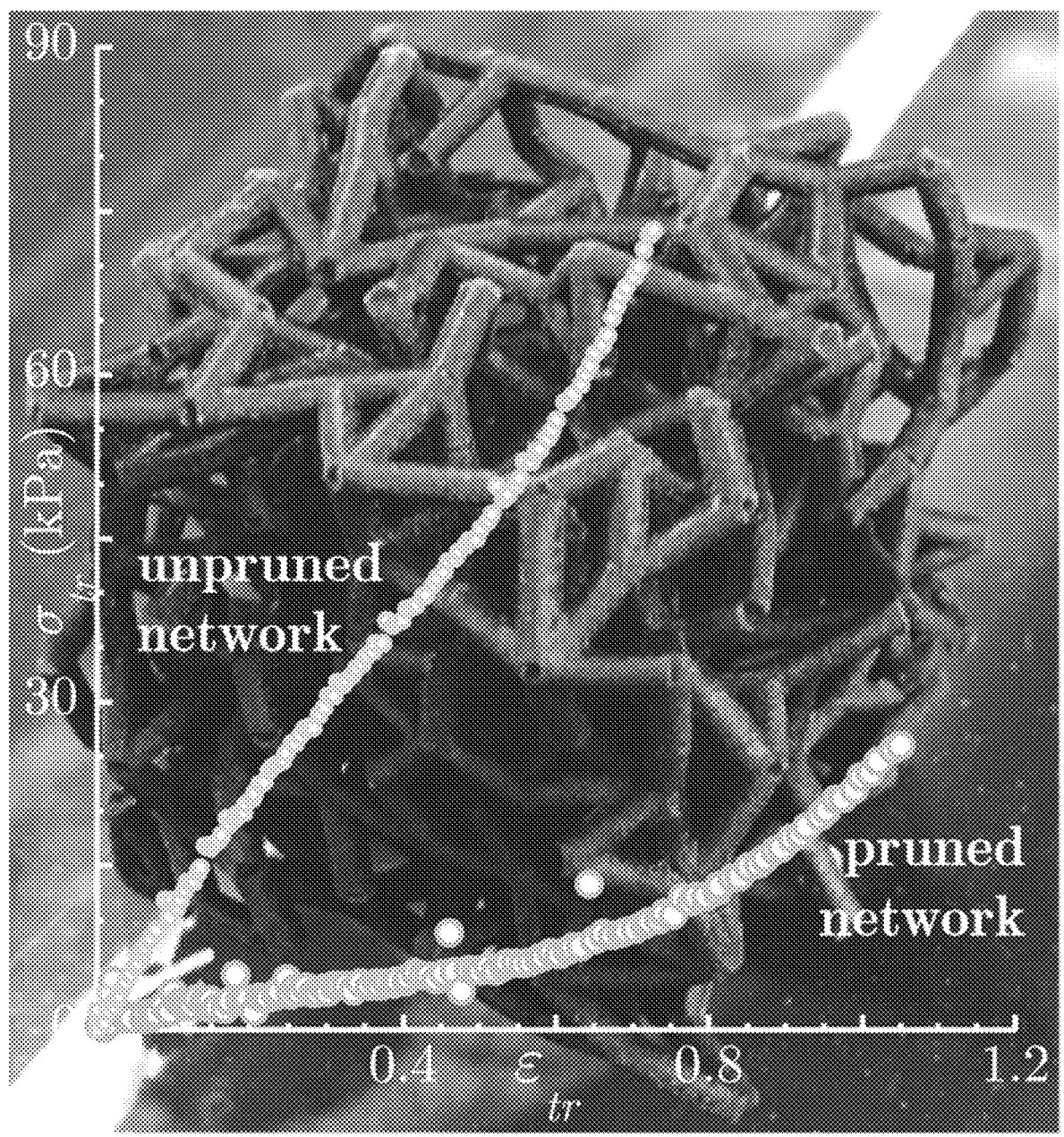

FIG. 11 shows bond length distribution of non-optimized (blue curve) and optimized (red curve) networks;

FIG. 12 shows experimental networks with tracked points A) without global node position optimization and B) after global node position optimization under uniaxial compression up to a strain of $\epsilon_z = 0.1$. in the compression tests in the current simulation model;

FIG. 13 shows trajectories of tracked points for networks A) without global node position optimization and B) after global node position optimization obtained from simulation (red) and experimental (blue) measurements of uniaxial compression up to a 17% compressive strain;

FIG. 14 shows Poisson's ratio as a function of vertical strain obtained from uniaxial compression in simulations (red curve) and experiments (blue curve);

FIG. 15 shows impact behavior of representative unpruned versus pruned networks for a) Free-body diagram of target $(m_t, k_t)$-impact mitigator $(m_m, k_m)$ system. b) Images of the unpruned and pruned 3D-printed disordered networks. c) Representative deformation behavior of the unpruned and pruned networks during linear impact experiments. The dashed lines are guides to help visualize the lateral expansion (x-axis) of networks due to the uniaxial compression in the y-direction;

FIG. 16 shows mechanical response to impact of representative of a 3D printed elastomeric resin with a Shore-A 30 hardness, a) Poisson's ratio (v) as a function of true compressive strain ($\varepsilon_{tr}$) of the unpruned-DNMM (top plot) and pruned-DNMM (bottom plot). b) True stress ($\sigma_{tr}$) vs. true compressive strain ($\varepsilon_{tr}$) curves of the unpruned-DNMM (top plot) and pruned-DNMM (bottom plot) as a function of impact velocity (v), c) The elastic modulus E of unpruned-DNMM (top plot) and pruned-DNMM as a function of impact velocity, v. d) Elastic modulus (E) of pruned and unpruned DNMMs for the range of impact velocities tested. Increasing marker size indicates increasing velocity;

FIG. 17 shows tuning mechanical impedance of different constituent materials (Shore-A 30, Shore-A 50 and Shore-A 70) via pruning. a) Comparison of the elastic modulus (E) as a function of density of network ($\rho$) of the unpruned and pruned DNMMs for different constituent materials. b) Specific acoustic impedance (z) versus density of network ($\rho$) at $\varepsilon_{tr} = 0$ of the unpruned and pruned DNMMs. Marker size indicates impact velocity ranging from v=0.1 m/s (smallest) to v=1.5 m/s (largest); and FIG. 18 shows drop mass experiments of the unpruned and pruned networks. Transmitted force (Pt), measured by the force transducer beneath the DNMM, as a function of time (t) of the unpruned and pruned networks 3D printed with Shore-A 30, 50 and 70. The inset figure illustrates the drop mass experiment; and FIG. 19 shows a graph of force versus compressive true strain.

DETAILED DESCRIPTION

A detailed description of one or more embodiments is presented herein by way of exemplification and not limitation.

It has been discovered that an inverse design machine produces a designer impact-mitigating architectured isotropic structure for a manufactured article that is made by a manufacturing machine. The designer impact-mitigating architectured isotropic structure is an aperiodic structure that has tunable global mechanical properties. The inverse design machine and method of operating the manufacturing machine for the manufactured article with the aid of the inverse design machine provides rapid discovery and generation of such designer materials for impact mitigation applications.

In the designer impact-mitigating architectured isotropic structure, the aperiodic arrangement of elastic elements provides impact-mitigating properties. The inverse design machine and processes herein use an inverse design approach for determining the designer impact-mitigating architectured isotropic structure, wherein the impact-mitigating properties can include materials properties such as a Young's modulus, shear modulus, bulk modulus, Poisson's ratio, density, acoustic impedance and the like. The designer impact-mitigating architectured isotropic structure is determined via selective pruning to produce designer impact-mitigating architectured isotropic structure with the impact-mitigating properties that is used to produce the manufactured article with the designer impact-mitigating architectured isotropic structure via additive manufacturing.

Selective pruning subjects a disordered primary structure that includes a network of nodes connected by bonds with an intrinsic set of primary properties that are characterized by potential energy density functions of bond stretching and bond bending. A structure adjuster prunes primary structure by removing specific bonds that contribute, e.g., to bulk modulus of manufactured article, providing designer impact-mitigating architectured isotropic structure with the isotropic mechanical properties referred to as impact-mitigating properties.

Inverse design machine 214 is used in making manufactured article 208 that includes designer impact-mitigating architectured isotropic structure 200. In an embodiment, with reference to FIG. 4, primary designer 217 provides primary structure 207 and manufactured article 208 that includes the primary structure 207 to inverse design machine 214 that produces designer impact-mitigating architectured isotropic structure 200 from structural analysis of manufactured article 208 with primary structure 207 and adjustment of to produce designer impact-mitigating architectured isotropic structure 200. Manufacturing machine 224 receives designer impact-mitigating architectured isotropic structure 200 and manufactures manufactured article 208 that includes designer impact-mitigating architectured isotropic structure 200 instead of primary structure 207. Accordingly, manufactured article 208 has greater impact mitigation with designer impact-mitigating architectured isotropic structure 200 than with primary structure 207.

Figure 4:
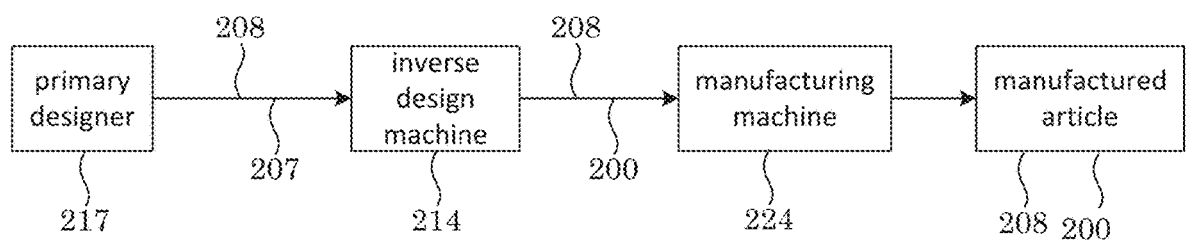
FIG. 4 shows a manufacturing system that includes an inverse design machine.
Figure 5:
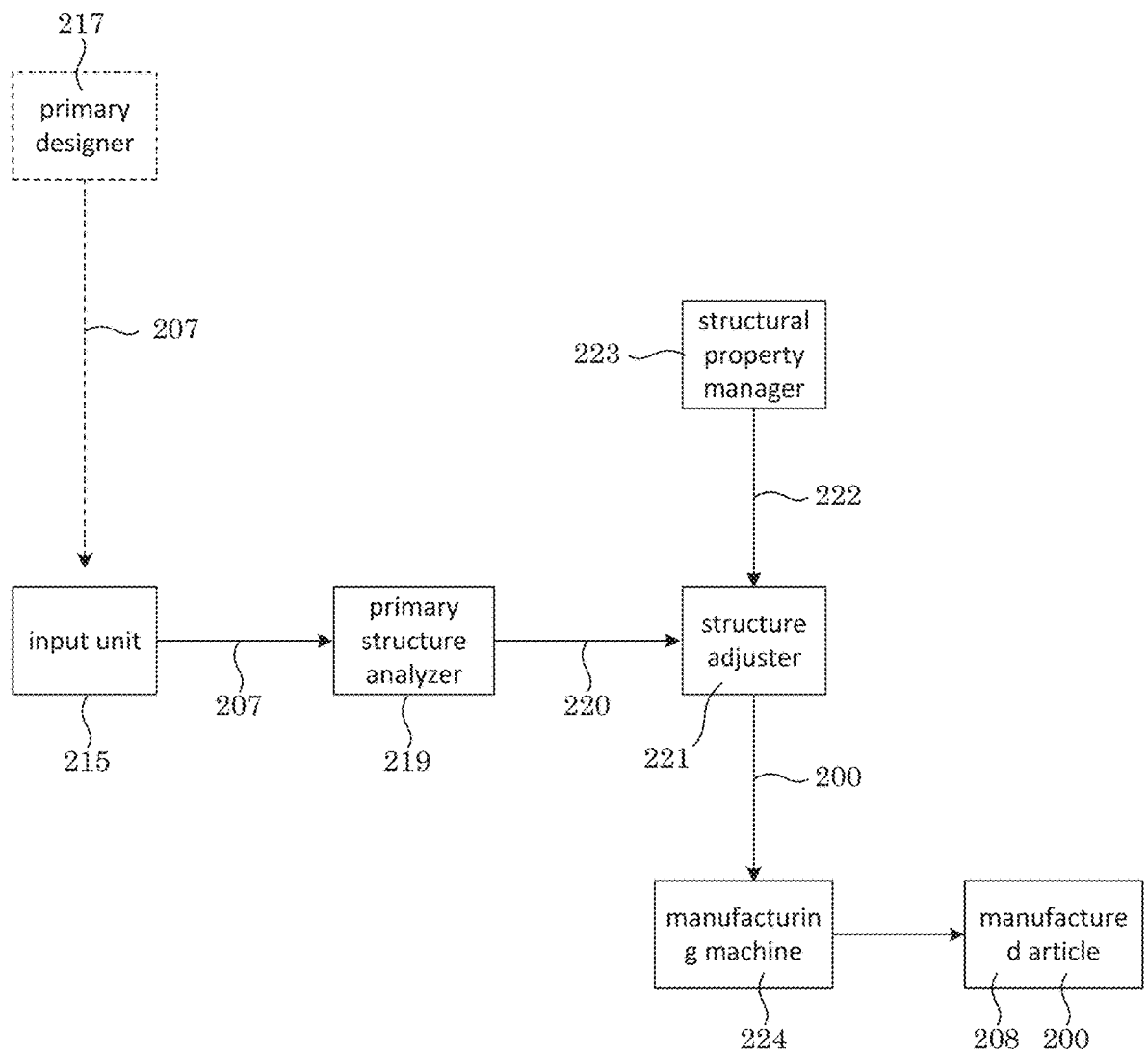
FIG. 5 shows an inverse design machine.

In an embodiment, with reference to FIG. 4 and FIG. 5, inverse design machine 214 includes: input unit 215 that receives primary structure 207; primary structure analyzer 219 in communication with input unit 215 and that receives primary structure 207 from input unit 215 and determines primary properties 220 of primary structure 207 from primary structure 207; structure adjuster 221 in communication with primary structure analyzer 219 and that receives primary properties 220 from primary structure analyzer 219, receives impact-mitigating properties 222 from structural property manager 223, and produces designer impact-mitigating architectured isotropic structure 200 for manufactured article 208 from primary properties 220 and impact-mitigating properties 222; and structural property manager 223 in communication with structure adjuster 221 and that provides impact-mitigating properties 222 to structure adjuster 221. According to an embodiment, inverse design machine 214 includes primary designer 217 in communication with input unit 215 and that produces primary structure 207.

In an embodiment, inverse design machine 214 includes manufacturing machine 224 in communication with structure adjuster 221 of inverse design machine 214 and that receives designer impact-mitigating architectured isotropic structure 200 from structure adjuster 221 and produces manufactured article 208 including designer impact-mitigating architectured isotropic structure 200 from inverse design machine 214. It is contemplated that manufacturing machine 224 includes a three-dimensional printer that three-dimensionally prints manufactured article 208 from designer impact-mitigating architectured isotropic structure 200 provided by inverse design machine 214. Moreover, manufactured article 208 can include, e.g., a polymer printed by manufacturing machine 224.

Figure 1:
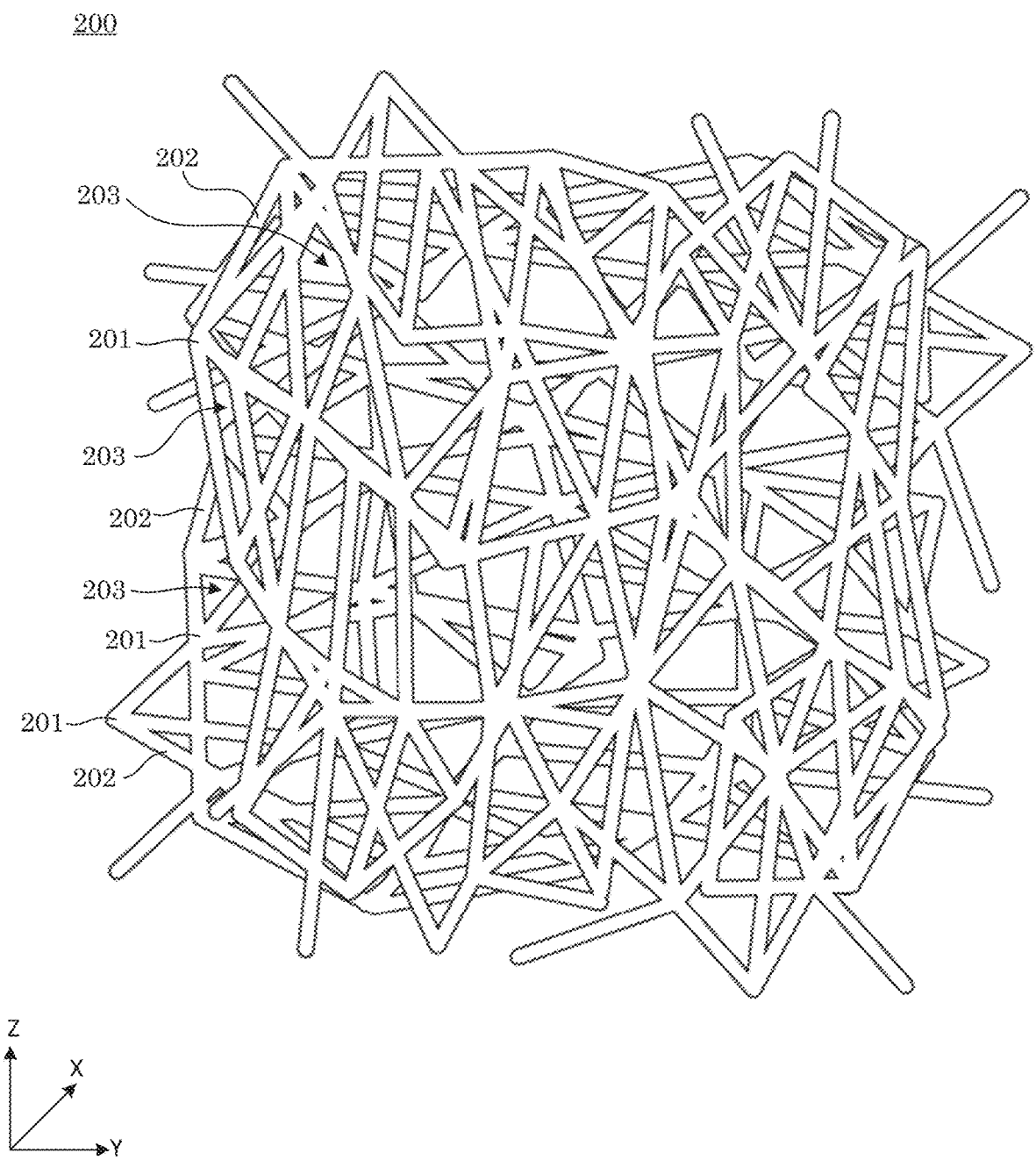
FIG. 1 shows a designer Impact-mitigating architectured isotropic structure after pruning the primary structure shown in FIG. 2.
Figure 2:
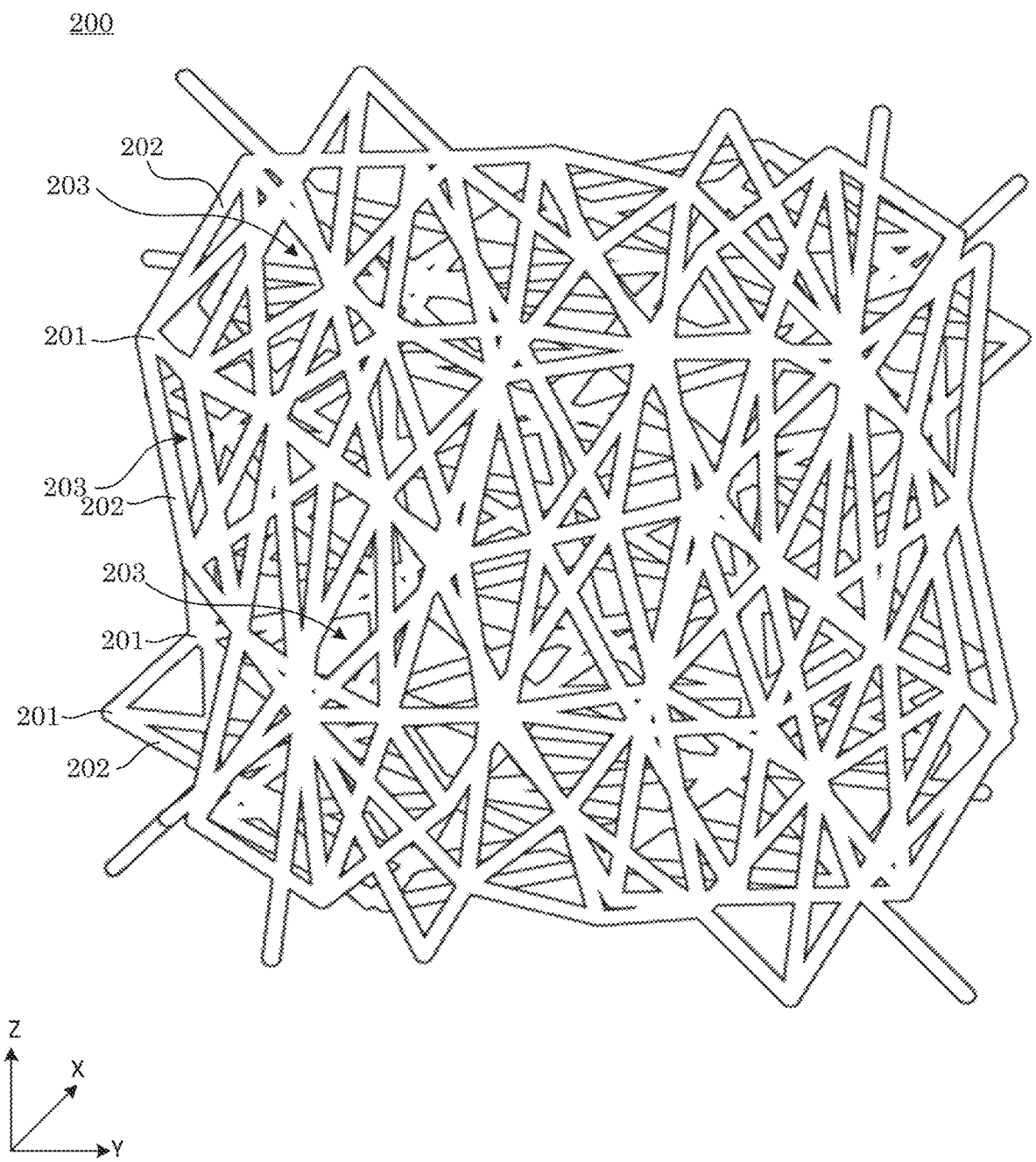
FIG. 2 shows a primary structure.
Figure 3:
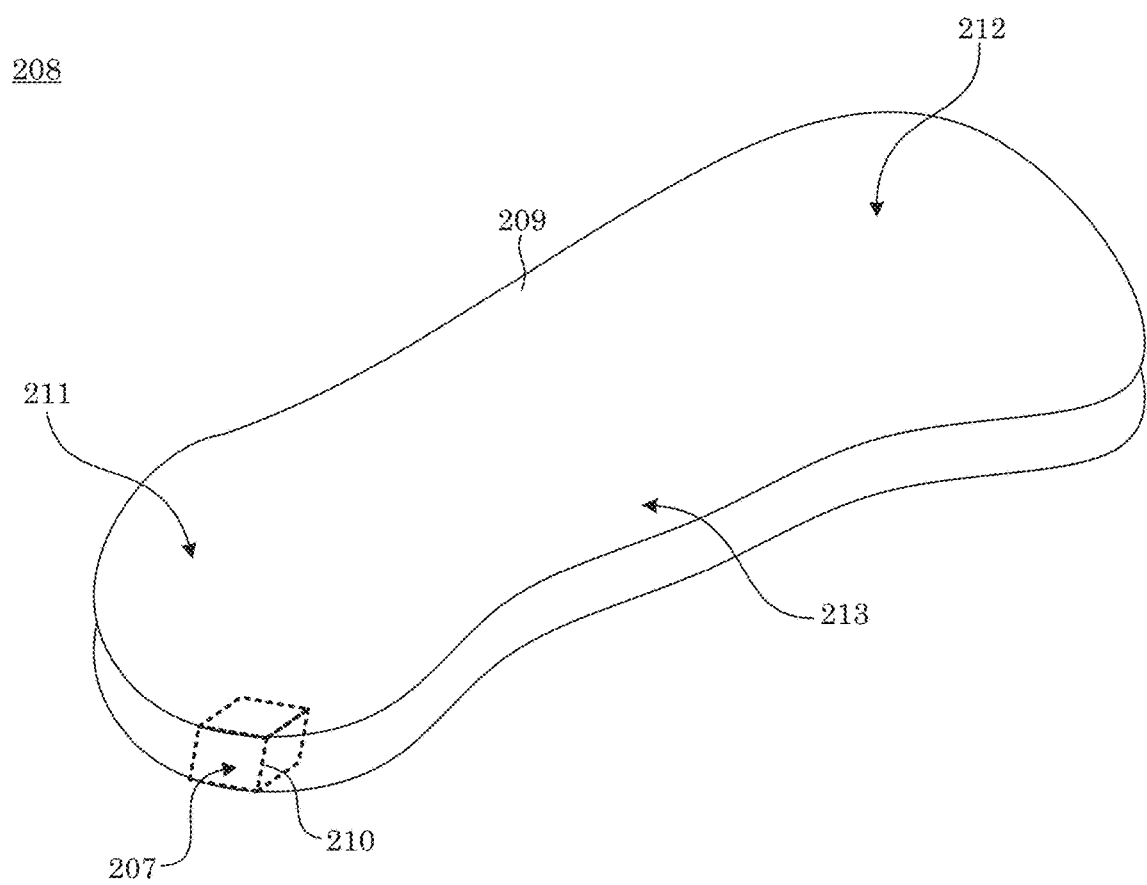
FIG. 3 shows a manufactured article.

In an embodiment, with reference to FIG. 3, manufactured article 208 includes disordered-network mechanical material 236 that includes bonds 237 and nodes 238. With reference to FIG. 2, primary structure 207 provides a three-dimensional reticulated structure of nodes 201 interconnected by bonds 202 with interstitial spaces 203 separating proximate nodes 201 interconnected with bonds 202 in disordered-network mechanical material 236. Although manufactured article 208 can be made from primary structure 207, under that circumstance, manufactured article 208 has mechanical properties of primary structure 207 that are referred to as primary properties 220. To increase impact mitigation of manufactured article 208, primary structure 207 is replaced by designer impact-mitigating architectured isotropic structure 200 in manufactured article 208, wherein designer impact-mitigating architectured isotropic structure 200 has impact-mitigating properties 222 that have greater impact mitigation than primary properties 220. With reference to FIG. 1 and FIG. 2, designer impact-mitigating architectured isotropic structure 200 also includes a three-dimensional reticulated structure of nodes 201 interconnected by bonds 202 with interstitial spaces 203 separating proximate nodes 201 interconnected with bonds 202 in disordered-network mechanical material 236, wherein certain bonds 202 in primary structure 207 are pruned to arrive at designer impact-mitigating architectured isotropic structure 200.

Manufactured article 208 with designer impact-mitigating architectured isotropic structure 200 provides impact mitigation to an object (e.g., a 3D structure fabricated from a polymeric, metallic, ceramic, or composite materials) designed to protect either individual (e.g., human or animal) or a physical object (protective structures to be integrated in vehicles, buildings, packaging materials) on which manufactured article 208 is disposed. Manufactured article 208 with designer impact-mitigating architectured isotropic structure 200 instead of primary structure 207 can be selected to be various types of articles including body armor, sports gear (e.g., helmets, helmet padding, athletic shoes, and the like. Moreover, these structures provide redirection of mechanical loads experienced under impact in directions that are less detrimental to function of the object that they protect by controlling the material's response under shear and compressive loading, which provide Poisson's ratio for how the material responds under bad. Materials can be engineered to have a positive Poisson's ration for expansion under compression, a Poisson's ratio of zero for zero expansion under compression, or a negative Poisson's ratio for contraction under compression. Accordingly, processes and devices herein provided engineering of mechanical metamaterials. In an embodiment, with reference to FIG. 3, manufactured article 208 is shoe insole 209 that includes heel portion 211, sole portion 213, and toe portion 212, wherein a designer for shoe insole 209 specifies an initial material construction for manufactured article 208 as primary structure 207. Structural cell 210 is a representative portion of insole 209 that includes primary structure 207 that is subjected to structural adjustment to produce designer impact-mitigating architectured isotropic structure 200 with impact-mitigating properties 222 form which manufactured article 208 is ultimately produced instead of primary structure 207. FIG. 1 and FIG. 2 respectively show designer impact-mitigating architectured isotropic structure 200 and primary structure 207 in structural cell 210

Figure 6:
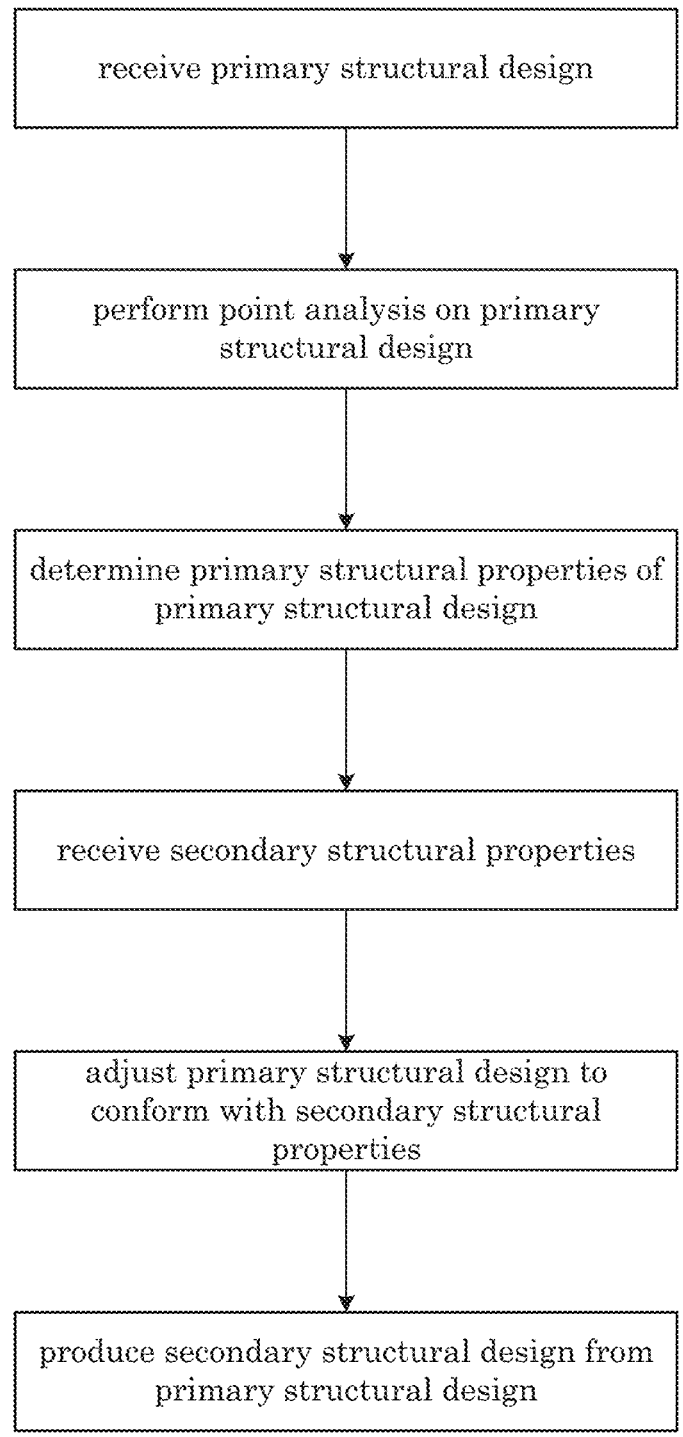
FIG. 6 shows a process for making a designer impact-mitigating architectured isotropic structure.
Figure 7:
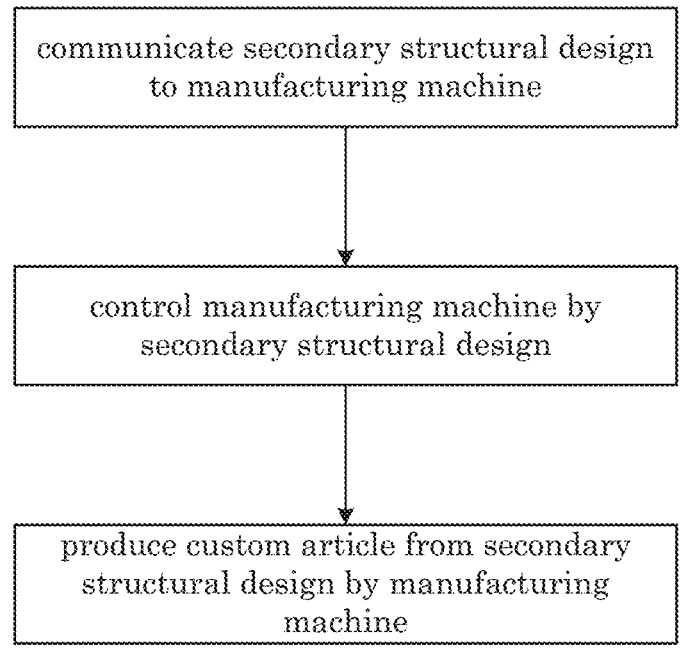
FIG. 7 shows a process for making a manufactured article that includes a designer Impact-mitigating architectured isotropic structure.

Designer impact-mitigating architectured isotropic structure 200 can be determined in various ways. In an embodiment, with reference to FIG. 6 and FIG. 7, a method of operating manufacturing machine 224 for manufactured article 208 with aid of inverse design machine 214 includes: providing inverse design machine 214 with primary structure 207 for manufactured article 208 and with impact-mitigating properties 222 for manufacturing machine 224, the primary structure 207 including a plurality of structural members arranged in primary structure 207 that collectively provide primary properties 220 to manufactured article 208 and that include primary shear modulus and primary bulk modulus that provide primary torsional rigidity and primary compression rigidity of manufactured article 208 being made by manufactured article 208; and the impact-mitigating properties 222 including impact-mitigating shear modulus and impact-mitigating bulk modulus that provide impact-mitigating torsional rigidity and impact-mitigating compression rigidity for manufactured article 208 being made by manufacturing machine 224, such that impact-mitigating properties 222 provide manufactured article 208 with greater structural impact mitigation than primary properties 220; receiving primary structure 207 from primary designer 217; initiating a point-by-point analysis on primary structure 207 in inverse design machine 214; determining primary properties 220 of primary structure 207 with primary structure analyzer 219 of inverse design machine 214; receiving, by structure adjuster 221 of inverse design machine 214, primary properties 220 from primary structure analyzer 219 and impact-mitigating properties 222 from structural property manager 223 of inverse design machine 214; adjusting, by structure adjuster 221, structural members in primary structure 207 until structural members collectively conform to impact-mitigating properties 222 such that primary structure 207 is structurally modified into designer impact-mitigating architectured isotropic structure 200 that includes impact-mitigating properties 222; controlling operation manufacturing machine 224 in accordance with designer impact-mitigating architectured isotropic structure 200 by inverse design machine 214; and forming, by manufacturing machine 224 under control of designer impact-mitigating architectured isotropic structure 200 from inverse design machine 214, manufactured article 208 that includes designer impact-mitigating architectured isotropic structure 200 instead of primary structure 207.

In an embodiment, adjusting structural members in primary structure 207 includes structural pruning of disordered-network mechanical material. According to an embodiment, adjusting structural members in primary structure 207 further includes global node position optimization of disordered-network mechanical material to produce designer impact-mitigating architectured isotropic structure 200.

In an embodiment, forming manufactured article 208 includes three-dimensional printing manufactured article 208 from designer impact-mitigating architectured isotropic structure 200 provided by inverse design machine 214. It is contemplated that manufactured article 208 includes a polymer that is printed by manufacturing machine 224. Further, manufacturing machine 224 can be a three-dimensional printer.

In an embodiment, a method of operating manufacturing machine 224 for manufactured article 208 with aid of an inverse design machine 214 includes: providing inverse design machine 214 with primary structure 207 for manufactured article 208 and with impact-mitigating properties 222 for manufacturing machine 224, the primary structure 207 including a plurality of structural members 235 arranged in primary structure 207 that collectively provide primary properties 220 to manufactured article 208 and that include primary shear modulus and primary bulk modulus that provide primary torsional rigidity and primary compression rigidity of manufactured article 208 being made by manufactured article 208; and impact-mitigating properties 222 including impact-mitigating shear modulus and impact-mitigating bulk modulus that provide impact-mitigating torsional rigidity and impact-mitigating compression rigidity for manufactured article 208 being made by manufacturing machine 224, such that impact-mitigating properties 222 provide manufactured article 208 with greater structural impact mitigation than primary properties 220; receiving primary structure 207 from primary designer 217; initiating point-by-point analysis on primary structure 207 in inverse design machine 214; determining primary properties 220 of primary structure 207 with primary structure analyzer 219 of inverse design machine 214; receiving, by structure adjuster 221 of inverse design machine 214, primary properties 220 from primary structure analyzer 219 and impact-mitigating properties 222 from structural property manager 223 of inverse design machine 214; adjusting, by structure adjuster 221, structural members 235 in primary structure 207 until structural members 235 collectively conform to impact-mitigating properties 222 such that primary structure 207 is structurally modified into designer impact-mitigating architectured isotropic structure 200 that includes impact-mitigating properties 222; controlling operation manufacturing machine 224 in accordance with designer impact-mitigating architectured isotropic structure 200 by inverse design machine 214; initiating formation of manufactured article 208 by controlling position of print head of manufacturing machine 224 under control of inverse design machine 214 in accord with designer impact-mitigating architectured isotropic structure 200; constantly determining position of print head of manufacturing machine 224 during formation of manufactured article 208; constantly providing inverse design machine 214 with position of the print head; repetitively performing in inverse design machine 214, at frequent intervals during formation of manufactured article 208, corrections to position of printer head based on designer impact-mitigating architectured isotropic structure 200 and to monitor completion of formation of manufactured article 208 by manufacturing machine 224 communicating corrections to position of printer head from inverse design machine 214 to manufacturing machine 224; correcting position of printer head by manufacturing machine 224 based on corrections received from inverse design machine 214; and completing formation, by manufacturing machine 224 under control of designer impact-mitigating architectured isotropic structure 200 from inverse design machine 214, manufactured article 208 that includes designer impact-mitigating architectured isotropic structure 200 instead of primary structure 207. In an embodiment, manufactured article 208 includes disordered-network mechanical material 236 that includes bonds 237 and nodes 238, and primary structure 207 provides three-dimensional reticulated structure of nodes 201 interconnected by bonds 202 with interstitial spaces 203 separating proximate nodes 201 interconnected with bonds 202 in disordered-network mechanical material 236. In an embodiment, adjusting structural members 235 in primary structure 207 includes structural pruning of disordered-network mechanical material 236. In an embodiment, adjusting structural members 235 in primary structure 207 further includes global node position optimization of disordered-network mechanical material 236 to produce designer impact-mitigating architectured isotropic structure 200. In an embodiment, forming manufactured article 208 includes three-dimensional printing manufactured article 208 from designer impact-mitigating architectured isotropic structure 200 provided by inverse design machine 214. In an embodiment, manufactured article 208 includes a polymer printed by manufacturing machine 224. In an embodiment, manufacturing machine 224 includes a three-dimensional printer.

The process for operating manufacturing machine 224 for manufactured article 208 with the aid of inverse design machine 214 can include different inverse design strategies to drive primary structure analyzer 219 in its determination of how structural changes provided by structure adjustor 221 is implemented. Here, a user starts with primary design 217 for manufacturing article 208 that meets the impact mitigation property requirements for an intended application with primary properties 220. These balance properties for a wide range of uses for multiple units made by manufacturing unit 208 for mass production. At this point inverse design machine 214 intercedes. The user specifies impact mitigating properties 222, point-by-point across manufacturing article 208, wherein impact-mitigating properties 222 are customized for a specific use or user. Inverse design machine 214 produces a prospective change to the primary design; structure adjustor 221 implements the design change; and structural property manager 223 determines whether the proposed design change improves or degrades impact mitigation relative to impact mitigating properties 222. If the design change degraded impact mitigation, the proposed change is discarded. If the design change improved impact mitigation, the design change is accepted. The inverse design machine loops back and proposes a second design change and evaluates the resulting properties. Inverse design machine 214 iterates this process until impact mitigating properties 222 meet selected values.

Proposed structural changes by inverse design machine 214 can include removing single bond 202 from the structure (referred to as pruning) or shifting a spatial location of a node 201 in the structure, referred to as node optimization. These are different inverse design methods that can be implemented with efficacy in providing the target requirements that depend on rigidity bond bending to stretching. The decision of structural modification is based on a targeted ratio of shear-to-bulk modulus that is selected at each location in manufactured article 208 based on targeted impact mitigation properties 222, analyzing how much each node 201 bond 202 contributes to the shear and bulk modulus, identifying bonds and nodes contributing to current properties, and eliminating the bond or shifting the node that modify properties toward targeted impact mitigation properties 222. Pruning and node optimization can be implemented independently or in combination.

In the method of operating manufacturing machine 224 for manufactured article 208 with aid of an inverse design machine 214, providing inverse design machine 214 with primary structure 207 for manufactured article 208 and with impact-mitigating properties 222 for manufacturing machine 224 can occur after the inverse design machine optimized the initial structure to meet desired mechanical response. The optimized model is output as a standard CAD or STL format that is compatible with digital manufacturing platforms, such as 3D printers.

In the method for operating manufacturing machine 224 for manufactured article 208 with the aid of inverse design machine 214, receiving primary structure 207 from primary designer 217. The primary structure can target generic, approximate impact properties that are optimized for use of manufacturing article 208 under selected operating conditions. The primary structure can be used as a starting point for a class of bonds and nodes architectures for manufactured unit 208. The approximate properties can be targeted for mass production of identical copies of manufacturing unit 208. The properties are not optimized for a specific situation but represent a trade-off for acceptable performance under certain conditions.

In the method for operating manufacturing machine 224 for manufactured article 208 with the aid of inverse design machine 214, point-by-point analysis on primary structure 207 in inverse design machine 214 is performed by determining mechanical properties material (bulk modulus, shear modulus) for manufacture and constitutive equations that describe material deformation and analyzing with engineering mechanics software to model how the primary structure will perform when subjected to an impact. The analysis can be performed with finite element analysis.

In the method for operating manufacturing machine 224 for manufactured article 208 with the aid of inverse design machine 214, determining primary properties 220 of primary structure 207 with primary structure analyzer 219 of inverse design machine occurs by determining mechanical properties for the material (bulk modulus, shear modulus) that is being manufactured, using constitutive equations for material deformation to analyze with engineering mechanics software how the primary structure will perform under impact. Analysis can be performed with finite element analysis methods.

In the method for operating manufacturing machine 224 for manufactured article 208 with the aid of inverse design machine 214, receiving, by structure adjuster 221 of inverse design machine 214, primary properties 220 from primary structure analyzer 219 and impact-mitigating properties 222 from structural property manager 223 of inverse design machine 214 can occur by the structure adjustor using the results of the point-by-point analysis from the engineering mechanics to analyze the contribution of each structural element (nodes 201 and bonds 202) to the shear and bulk modulus. Based on this analysis, structure adjuster 221 decides which structural element (nodes 201 or bonds 202)

should be changed to drive the achieve the targeted impact-mitigating properties. Based on this analysis, the structure adjuster 221 decides which element should be changed.

In the method for operating manufacturing machine 224 for manufactured article 208 with the aid of inverse design machine 214, adjusting, by structure adjuster 221, structural members in primary structure 207 until structural members collectively conform to impact-mitigating properties 222 such that primary structure 207 is structurally modified into designer impact-mitigating architectured isotropic structure 200 that includes impact-mitigating properties 222 can be performed by repeating the point-by-point analysis based on engineering mechanics, presumable using finite element methods, to compare the new impact mitigation properties of the modified structure produced by the structural property manager 223 to the targeted impact mitigating properties 222.

In the method for operating manufacturing machine 224 for manufactured article 208 with the aid of inverse design machine 214, controlling operation manufacturing machine 224 in accordance with designer impact-mitigating architectured isotropic structure 200 by inverse design machine 214 can occur by outputting the optimized modified structure created by the structure adjuster 221 as an industry standard CAD, STL or solids model that is compatible with the manufacturing machine 224.

In the method for operating manufacturing machine 224 for manufactured article 208 with the aid of inverse design machine 214, initiating formation of manufactured article 208 by controlling position of print head of manufacturing machine 224 under control of inverse design machine 214 in accord with designer impact-mitigating architectured isotropic structure 200 can occur by sending the CAD, STL, or solids model as an output to the manufacturing machine.

In the method for operating manufacturing machine 224 for manufactured article 208 with the aid of inverse design machine 214, constantly determining a position of print head of manufacturing machine 224 during formation of manufactured article 208 can occur through process control and feedback loops of manufacturing machine 224. These machine control and feedback loops can be integrated into the given manufacturing machine. Elements herein can conform to industry standard CAD, STL or other solids models used in manufacturing.

In the method for operating manufacturing machine 224 for manufactured article 208 with the aid of inverse design machine 214, constantly providing inverse design machine 214 with position of the print head can occur through the process control and feedback loops of the manufacturing machine 224. These machine control and feedback loops can be integrated into the manufacturing machine. Elements herein can interface with and conform to industry standard CAD, STL or other solids models used in manufacturing.

In the method for operating manufacturing machine 224 for manufactured article 208 with the aid of inverse design machine 214, repetitively performing in inverse design machine 214, at frequent intervals during formation of manufactured article 208, corrections to position of printer head based on designer impact-mitigating architectured isotropic structure 200 and to monitor completion of formation of manufactured article 208 by manufacturing machine 224 can occur through the process control and feedback loops of the manufacturing machine 224. These machine control and feedback loops can be integrated into the manufacturing machine. Elements herein can interface with and conform to industry standard CAD, STL or other solids models used in manufacturing.

In the method for operating manufacturing machine 224 for manufactured article 208 with the aid of inverse design machine 214, communicating corrections to position of printer head from inverse design machine 214 to manufacturing machine 224 can occur through the process control and feedback loops of the manufacturing machine 224. These machine control and feedback loops can be integrated into the manufacturing machine. Elements herein can interface with and conform to industry standard CAD, STL or other solids models used in manufacturing.

In the method for operating manufacturing machine 224 for manufactured article 208 with the aid of inverse design machine 214, correcting position of printer head by manufacturing machine 224 based on corrections received from inverse design machine 214 can occur through the process control and feedback loops of the manufacturing machine 224. These machine control and feedback loops can be integrated into the manufacturing machine. Elements herein can interface with and conform to industry standard CAD, STL or other solids models used in manufacturing.

In the method for operating manufacturing machine 224 for manufactured article 208 with the aid of inverse design machine 214, completing formation, by manufacturing machine 224 under control of designer impact-mitigating architectured isotropic structure 200 from inverse design machine 214 can occur through the process control and feedback loops of the manufacturing machine 224. These machine control and feedback loops can be integrated into the manufacturing machine. Elements herein can interface with and conform to industry standard CAD, STL or other solids models used in manufacturing.

In the method for operating manufacturing machine 224 for manufactured article 208 with the aid of inverse design machine 214, structural pruning of disordered-network mechanical material 236 can occur by having structure adjustor 221 use results of point-by-point analysis from the engineering mechanics to analyze the contribution of each structural bond 202 to the shear and bulk modulus. Based on this analysis, the structure adjuster 221 decides which bonds 202 should be removed to drive the achieve the targeted impact-mitigating properties. Based on this analysis, the structure adjuster 221 decides which bond should be pruned.

In the method for operating manufacturing machine 224 for manufactured article 208 with the aid of inverse design machine 214, global node position optimization of disordered-network mechanical material to produce designer impact-mitigating architectured isotropic structure 200 by having the structure adjustor using the results of the point-by-point analysis from the engineering mechanics to analyze the contribution of each nodes 201 to the shear and bulk modulus. Based on this analysis, the structure adjuster 221 calculates which node can be spatially shifted to drive the achieve the targeted impact-mitigating properties. Based on this analysis, the structure adjuster 221 decides which node should be shifted.

Designer impact-mitigating architectured isotropic structure 200, and processes disclosed herein have numerous beneficial uses and can be used in various manufactured articles, including shoe soles to absorb impact customized for an individual gate, stride and weight characteristics, helmet liners for sporting equipment and transportation that can decouple rotational and translation impact loading to reduce mild brain trauma, the customized design of impact mitigating components in structures for vehicles or protective equipment to redirect they loading upon impact, protective foams or packing materials for shipping and transportation of delicate articles, or any other type of mechanical metamaterial for impact mitigation where the goal is to redirect mechanical loads in non-traditional routes not achievable by traditional materials. Advantageously, designer impact-mitigating architectured isotropic structure 200 overcomes limitations of technical deficiencies of conventional compositions with tailored mechanical responses that can be engineered to structural design, creating mechanical responses that are not achieved with traditional materials. Such can be mechanical metamaterials. Further, embodiments herein provide customized mechanical response for individual applications, on an individual case basis, by integrating inverse design machine 224 with on-demand or digital manufacturing methods.

Designer impact-mitigating architectured isotropic structure 200, inverse design machine 214, and processes herein independent controls a structural response in shear and compressive loading using inverse design described herein. A user specifies properties for mechanical response. The inverse design machine determines optimum design and communicates such to the digital manufacturing platform. This simplifies development of applications for impact mitigation and provides user-specified customization. For orthotic insoles customized to dimensions of a user's foot, embodiments herein provide impact mitigation properties for such insoles to be customized to the user. Designer impact-mitigating architectured isotropic structure 200, inverse design machine 214, and processes herein provide the creation of designer mechanical responses, responses that conventional unstructured materials do not provide. Inverse design machine 214 creates disordered but structured materials as designer impact-mitigating architectured isotropic structure 200 that have unique or non-traditional mechanical responses and having size-scales that can span from meters to nanometers. Conventional finite element designing of materials use trial and error discovery with human intuition. Inverse design machine 214 provides designer impact-mitigating architectured isotropic structure 200 that is non-intuitive and different than conventional architectured materials, e.g., primary structure 207, such as mechanical metamaterials that have a periodic structure with anisotropic mechanical properties as primary properties 220. Designer impact-mitigating architectured isotropic structure 200 beneficially has isotropic mechanical properties as impact-mitigating properties 222 that are selected for a specific impact mitigation application.

The articles and processes herein are illustrated further by the following Examples, which are non-limiting.

EXAMPLES

Example 1. Rational Design of Three-Dimensional Auxetic Metamaterials from Disordered Networks Tuning a local response of disordered networks can lead to anomalous mechanical properties such as a negative Poisson's ratio, namely, auxetic behaviors. Although pruning local bonds has been proven successful in obtaining 2D auxetic metamaterials from disordered networks, it is challenging to design 3D auxetic materials from disordered networks that agree with experiments. The design of disordered isotropic auxetic materials requires independent control of bulk and shear moduli. In 3D, it requires the shear modulus, G, to be 1.5 times larger than the bulk modulus, B, which is much stricter than G>B in 2D. Here we investigate the design strategy, namely, global node position optimization, for disordered 3D networks. We show that global node position optimization is effective in designing 3D isotropic auxetic networks, and faithfully allows for independent control of shear and bulk moduli, when the angle bending resistance, kθ, is much lower than the bond stretching resistance, kb. After global node position optimization, without changing the coordination number or reducing the material density, the bulk modulus is reduced by almost two decades, while the shear modulus remain unchanged and can be even slightly increased at a low ratio of $$\frac{k_\theta}{k_b}.$$

The computationally designed networks are fabricated by composite-materials 3D printing, and the Poisson's ratio is measured. The experimental measurements are quantitatively consistent with computational calculations. The research demonstrates the power of top-down design for disordered auxetic materials with independent control of moduli and can be generalized to the design of other mechanical metamaterials.

Materials of a negative Poisson's ratio (NPR) are referred to as auxetic materials. Due to both the anomalous deformation modes and the shear/bulk moduli ratio, auxetic materials have applications such as biocompatibility, impact absorption, and acoustic attenuation. Disordered networks can be designed to have auxetic behaviors with an arbitrary anisotropy. Disordered 3D auxetic networks have broader applications, such as indentation resistance and impact mitigation, than their 2D counterparts. However, there are few works reported on the top-down computational design of disordered 3D networks that is quantitatively reproduced in experiments.

Poisson's ratio, v, is a function of bulk modulus, B, and shear modulus, G [1]:

$$v = \frac{d - \frac{2G}{B}}{d(d-1) + \frac{2G}{B}} \tag{1}$$

where d is the dimension. The higher the ratio of $$\frac{G}{B},$$

the more negative is v. This implicates that the design of auxetic materials is correlated with the independent control of shear and bulk moduli. In fact, a high shear modulus and a low bulk modulus is desirable for applications such as nuclear reactors. Bond-pruning can be based on local contributions to shear and bulk moduli for design of auxetic materials from disordered central-force spring networks. G is not reduced, and B is sharply decreased after pruning, and 40% of bonds can be pruned to obtain auxetic behavior in 2D networks, and the decrease of bulk modulus is accompanied by a reduction of shear modulus by 50%. This inhibits the design of auxetic materials with independent control of bulk and shear moduli. The design of 3D auxetic networks is even more difficult than 2D networks since the minimum requirement for auxetic behaviors in 3D is G>1.5 B, as opposed to the minimum requirement of G>B in 2D. The mechanics is also more complicated in 3D due to additional degrees of freedom. 2D auxetic networks can be obtained from lattice geometries by bond length distortion based on a pure spring network model but may not achieve a negative Poisson's ratio in 3D networks.

In bond-pruning, a bond is removed at a time, which corresponds to a discrete design space. By contrast, the node positions provide a continuum design space to program the network structures. The coordination number of the network is not reduced with the optimization of node positions, making it possible to introduce less reduction in the shear modulus. In addition, it is important to include angle bending resistance to the pure spring network models, since networks with even a small angle bending resistance have much lower critical coordination number for rigidity transition than central-force spring networks.

Efficiencies of bond-pruning and global node position optimization in the design of three-dimensional auxetic disordered networks is described here. Isotropically auxetic 3D mechanical networks are generated from disordered structures by carefully designed computational algorithms. We also analyze the effects of angle bending resistances on the independent tunabilities of G and B by decomposing the moduli. Computationally designed networks are fabricated in experiments by composite-materials 3D printing. Quantitative consistence between computational calculations and experimental measurements are established.

Regarding effects of bond pruning and node position optimization for the design of auxetic networks, to find an efficient design, we systematically investigated both the bond pruning and global node position optimization methods. Two pruning protocols are investigated. In protocol I, the bonds leading to min ΔGi are permanently removed; in protocol II, the bonds leading to max Δvi are permanently removed. Furthermore, we perform global node position optimization on the networks pruned based on both pruning protocols, as well as unpruned networks. Node position optimization is distinct from bond pruning as the former is determined by the local bond-level response, while the latter optimizes the Poisson's ratio by simultaneously updating all the node positions. Strikingly, node position optimization is always effective in obtaining auxetic behaviors, regardless of how the network is pruned, or whether the network is pruned or not.

Figure 8:
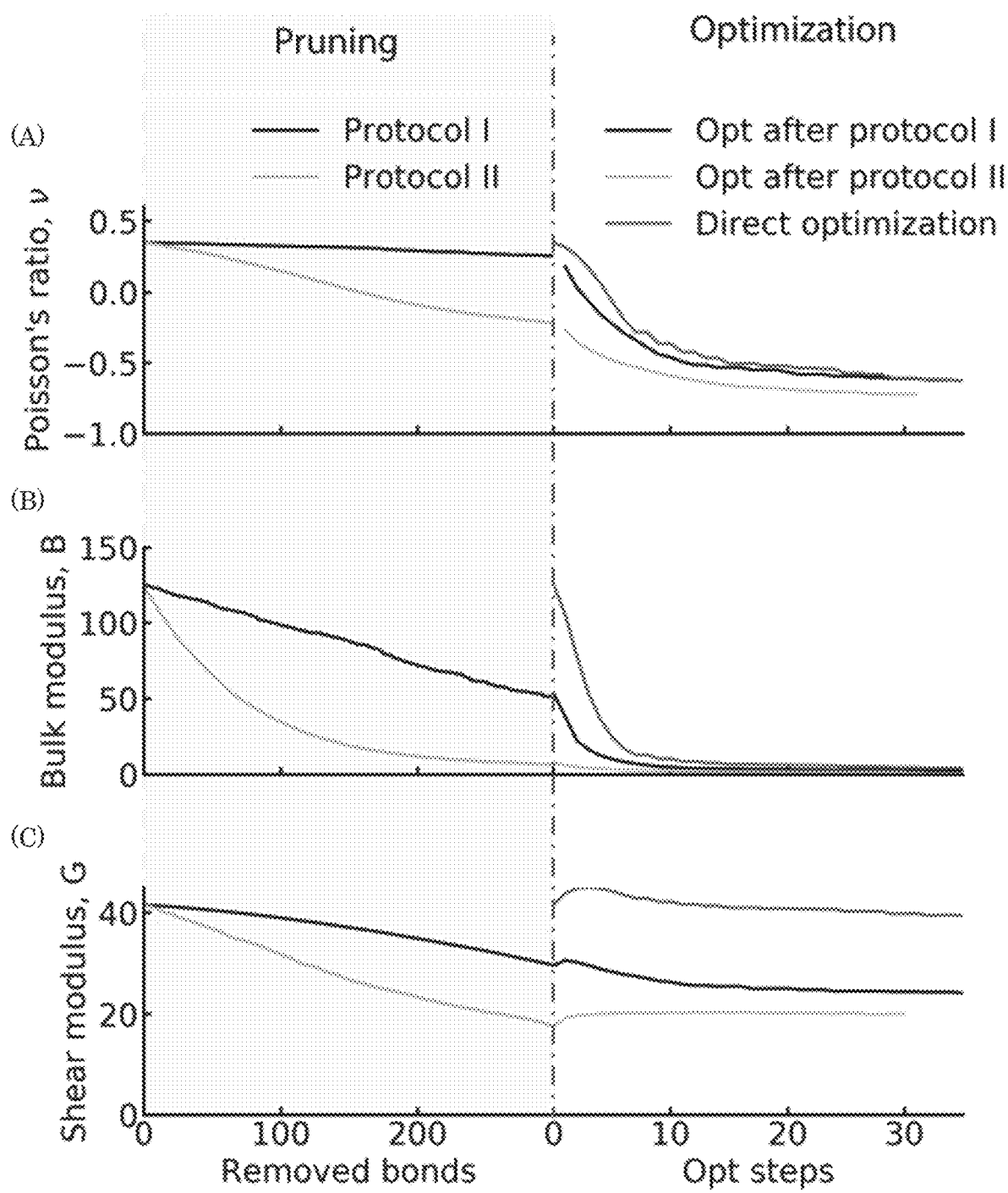
FIG. 8 shows changes in A) Poisson's ratio, B) bulk modulus, B, and C) shear modulus, G, during bond pruning and node position optimization. Left panels show bond pruning; right panels show node position optimization following the pruning except the blue curves. The black curves are corresponding to pruning protocol I, namely, bonds leading to min $\Delta G$ are permanently removed; the lightest curves are corresponding to pruning protocol II, namely, bonds leading to min $\Delta v$ are permanently removed; the grey curves denote node position optimization directly from a network from packing.

Regarding the efficacy of the pruning protocols, we choose a network with a coordination number Z=7.2 generated from packing. FIG. 8A, left panel shows that protocol II is more effective in bringing down the Poisson's ratio, comparing with protocol I. The reduction of v in protocol I is negligible, while in protocol II, the Poisson's ratio is reduced from 0.35 to −0.21 after about 16% of the bonds are removed and Z of the networks are dropped from 7.2 to 6.1. FIG. 8B, left panel shows that the bulk modulus is reduced by two orders of magnitude in protocol II, consistent with the reduction of v. However, protocol II also causes more reduction in the shear modulus, G, than protocol I (FIG. 8C, left panel). The reduction of G restricts the further decrease of v, since v decreases with $$\frac{G}{B}.$$

By comparison, node position optimization successfully brings v down below −0.5 for the networks pruned by both protocols (FIG. 8A, right panel). Furthermore, when we modify the optimization protocol to increase v instead of decreasing v, we find that v is recovered to above 0.43, slightly higher than the Poisson's ratio of a network directly from packing with the same coordination number and with the same kθ and kb.

Moreover, we directly perform node position optimization on unpruned networks of a coordination number of 7.2, and v is also reduced below −0.5 after only 25 optimization steps.

This indicates that node position optimization is efficient in designing auxetic networks, without changing the coordination number. Node position optimization is not only effective in reducing B for all networks (FIG. 8, middle panel), but also effective in maintaining the shear modulus, G (FIG. 8, bottom panel), indicating a more independent control of B and G than the bond pruning methods.

To challenge the robustness of the optimization in lab-sized networks, we perform uniaxial stress tests on finite-sized systems. The Poisson's ratio is still negative for the finite sized networks with 500 nodes. (The video of the quasi-static compression) When we increase the system size by two times in each dimension, the negative Poisson's ratio gets closer to that calculated for periodic systems.

Regarding effect of angle bending resistance on global node position optimization, to challenge the effectiveness of the node position optimization, we test the optimization method on a network of coordination number Z=6.1 directly generated from packing. We vary the angle bending resistance by three orders of magnitude and investigate the tunability in v, B and G. FIG. 10 shows the change of Poisson's ratio and moduli during global node position optimization with various values of angle bending resistances that span three decades, i.e., $$\frac{k_\theta}{k_b} = 0.001, \frac{k_\theta}{k_b} = 0; \text{ and } \frac{k_\theta}{k_b} = 0.$$

FIG. 10A shows that the node position optimization is effective in reducing the Poisson's ratio when the angle bending resistance is in the regime smaller than two orders of magnitude of the bond stretching resistance. However, when $$\frac{k_\theta}{k_b} = 0.$$

although the Poisson's ratio is smaller in the initial structure than that of the same network structure with a smaller kθ, the lower limit of the Poisson's ratio after global node position optimization is positive.

FIG. 10B shows that when $$\frac{k_\theta}{k_b} <= 0;$$

the bulk modulus is reduced by two orders of magnitude, while the change in shear modulus is very small. For $$\frac{k_\theta}{k_b} = 0;$$

the shear modulus is even increased after optimization. However, for $$\frac{k_\theta}{k_b} = 0;$$

the bulk modulus is only reduced by half and plateaus, and the shear modulus is also reduced by ⅓ and plateaus.

Figure 9:
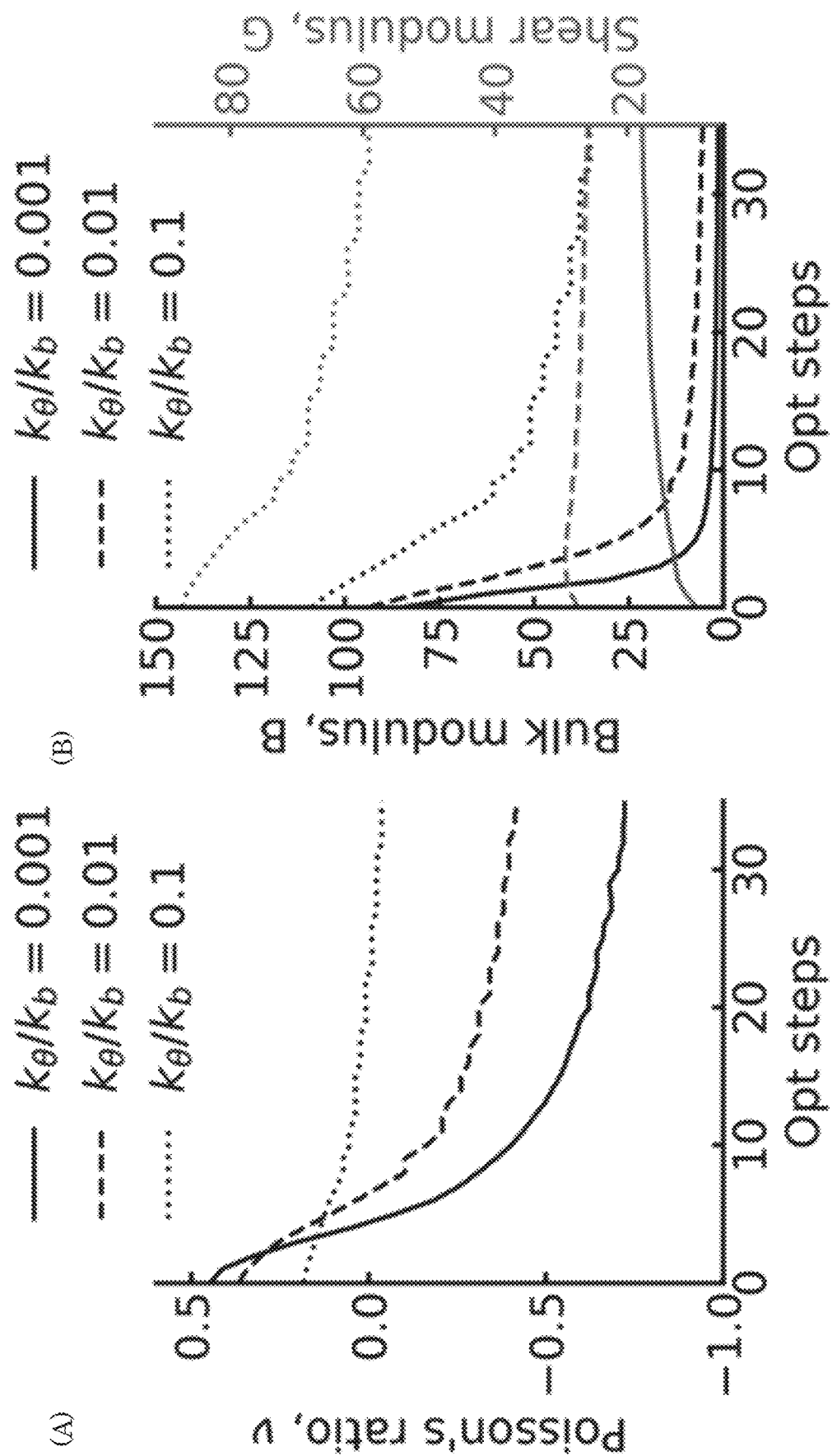
FIG. 9 shows effects of angle bending resistance on node position optimization. The changes in Poisson's ratio A), B) and C) and moduli D), E) and F) during node position optimization. The solid curves are for $$\frac{k_\theta}{k_b} = 0.001;$$

We decompose the bulk and shear moduli into contributions from bond stretching resistance and angle bending resistance. FIG. 9 show that the angle bending resistance does not directly contribute to the bulk modulus. This is consistent with the definition of bulk modulus and the fact that the angle bending resistance does not contribute to the trace of the stress tensor since it is always tangential to the bond it acts on. However, the angle bending resistance indirectly influences the bulk modulus.

Combining the left panels and right panels of FIG. 9, we find that the change in G is always within an order of magnitude during global node position optimization. B is only reduced by half when $$\frac{k_\theta}{k_b} = 0.1,$$

while B is reduced by two orders of magnitude when $$\frac{k_\theta}{k_b} <= 0.01.$$

Therefore, the limited reduction in B is the major reason for the difficulties in reducing v by node position optimization for $$\frac{k_\theta}{k_b} = 0.1.$$

Directly enforcing a wider bond length distribution is not always successful in designing arbitrary auxetic 3D networks. FIG. 11 shows that, after global node position optimization, the bond length distribution of the 3D networks is indeed wider than that of non-optimized networks. Moreover, by global node position optimization, we can decrease Poisson's ratio of 3D disordered networks below zero, without prior assumption about the final geometry, such as the bond length distribution.

We cross-validate the computational design by experimental networks prepared by composite materials 3D printing. We choose plastics as the material for the middle portion of the bonds, and rubber as the material for the end portion of the bonds attached to the nodes. The strength of angle bending resistance, kθ, is tuned by adjusting the proportion of the two materials, and the shape of the end portion of the bonds. We choose the material composition and bond shape that are best represented by $$\frac{k_\theta}{k_b} = 0.01.$$

FIG. 12 shows the comparison of two compressed experimental networks at a strain of 10%. The network in FIG. 12A is without global node optimization and the network in FIG. 12B is with global node optimization. The colored dots highlight the tracked nodes at a strain of 10%. The colored lines show the trajectories of the tracked nodes during compression. The trajectories show that, while the former network expands in the lateral direction, the latter network contracts in the lateral direction. In addition, FIG. 13 shows the trajectories of tracked nodes for the two networks during compression from both simulations (red curves) and experiments (blue curves). The simulation trajectories overlap with the experimental trajectories at small strains, but the two sets of trajectories split at higher strains, likely due to bond overlapping that happens to experimental networks, but not fully considered FIG. 14 shows the Poisson's ratio as a function of strain from the measurements of both experimental and simulation networks. For the network without global node optimization, in both simulation and experimental measurements, the Poisson's ratio is close to 0.4. For the network with global node optimization, in both simulation and experimental measurements, the Poisson's ratio is below −0.2 at small strains. In experiments, the Poisson's ratio increases with the strain, but remains below −0.1 at a strain of 10%. The effect of optimization on tuning the auxetic property can be further confirmed by the videos of the drop tower tests on non-optimized and optimized networks presented in supplemental video V1 and V2.

For three-dimensional isotropic auxetic materials from disordered networks, global node position optimization is effective to achieve auxetic properties because it expands the design space from a discrete localized space to a continuum global space. The computationally designed networks are cross-validated by experimentally 3D-printed and measured networks and have quantitative agreement. In addition, global node position optimization is not only effective in reducing the Poisson's ratio to negative values but also effective in recovering the Poisson's ratio of pruned network to positive values close to 0.5. This confirms that the Poisson's ratio can be tuned in a wide range without affecting the coordination number.

In bond-pruning, every pruning step proceeds as follows. A bond i is tentatively removed from the network, where i is the bond index. Then the decrease in B, G and v, namely ΔBi, ΔGi and Δvi are calculated for the network. The tentatively removed bond is then put back to the network. We repeat this procedure for every bond in the network. We then select a bond to be permanently removed based on the pruning protocol. Two pruning protocols are studied: In protocol I, the bond leading to min ΔG is permanently removed; in protocol II, the bond leading to max Δv is permanently removed.

To account for the redistribution of bond-level contribution to B and G after bond removal, only one bond is permanently removed at each step.

The node position optimization is realized by a constrained gradient descent algorithm:

$$r_{i\alpha}^{n+1} = r_{i\alpha}^n - \lambda \frac{\partial (v + L_1 + L_2)}{\partial r_{i\alpha}} \qquad (2)$$

where riα is the α component of the coordinate of node i, n is the iteration number, λ is the learning rate, and L1 and L2 are two constraints implemented to avoid bond overlapping, where $$L1 = l1 \times [H(\theta\min - \theta j)(\theta j - \theta\min)] \qquad (3)$$

where l1=0.01 is a constant, θ is the angle between connected bonds, j is the angle index, θ min=15° is the minimum angle allowed, and H(θ min−θj) is the Heaviside step function.

$$L2 = l2 \times [H(r\,min-rij)(rij-r\,min)] \quad (4)$$

where l2=1000.0 is a constant, rij. is the distance between node i and node j, r min=0.3 is the minimum distance allowed in length units, and H(r min−rij) is the Heaviside step function.

At every step, the coordinate of a node i, ri, is displaced infinitesimally in the α direction, the force field parameters for the equilibrium angle and bond length are updated accordingly, and then B, G and v are measured for the virtually displaced network. After a scan of all the nodes in all three directions by this procedure, we calculate the gradient of (v+L1+L2) with respect to the node coordinate components. Then we update the node positions according to eq. (2).

Elastic constants cijkl are calculated by taking the derivative of the stress tensor with respect to the strain tensor components. Energy minimization is performed at various strain to allow nonaffine relaxation. G and B are calculated as $$G = \tfrac{1}{15}(3c_{yzyz} + 3c_{xzxz} + 3c_{xyxy} + c_{xxxx} + c_{yyyy} + c_{zzzz} + c_{yyzz} -$$

and $$B = \tfrac{1}{9}(c_{xxxx} + c_{yyyy} + c_{zzzz} + 2c_{yyzz} + 2c_{xxzz} + 2c_{xxyy}).$$

The Poisson's ratio is calculated by eq. (1) during bond pruning and optimization and measured by the displacement of edge nodes during validation. In the athermal limit, the Hamiltonian for the simulations is written as:

$$H = U = \frac{1}{2}\sum_i k_{bi}\frac{(l_{bi}-l_{b0i})^2}{l_{b0i}^2} + \frac{1}{2}\sum_m k'_{\theta m}(\theta_m - \theta_{0m})^2 \quad (5)$$

where U is the potential energy, kb and kθ0 are the bond stretching resistance and angle bending resistance, respectively.

$$k'_\theta = \frac{2k_\theta}{N_c - 1},$$

where kθ is the total angle bending resistance per bond per node, and Nc is the coordination number. The factor of 2 accounts for 2 rotational degrees of freedom for angle bending of each bond in 3D, as opposed to only 1 rotational degree of freedom in 2D. lbi and θm are the bond length of bond i and the bending angle of angle m, respectively. lb0 and θ0 are the equilibrium bond length and the bending angle, respectively. The bending angle is defined between two connected bonds, similar to the respective definitions in widely used classical molecular dynamics force fields. lb0 and θ0 are the equilibrium bond length and bending angle, respectively. kb and kθ have the same units and can be directly compared with each other.

Regarding dual-material 3D printing, to create a 3D printable model of the disordered networks studied, we use a python script that creates one bond at a time and merges them together to form the network. Each bond of the network is a cylinder with its diameter ≈0.4 times the average length of the bonds. We convert this structure to an .STL file format that can then be 3D printed.

All the disordered-network metamaterial samples were 3D printed using UV-curable printing resins on a 3D printer. To minimize kθ in the samples, the nodes were printed using materials that was significantly softer than the bond material. Stiff material was used as the material for the bonds. and an elastomeric material was for the nodes. Quasi-static, uniaxial compression experiments were performed no 3D disordered network samples using a texture analyzer Experiments were displacement-controlled at a rate of 0.1 mm s-1 for both loading and unloading. Force and displacement were recorded. A digital camera captured images of the sample deformation during the experiments at a rate of 10 frames per second.

Example 2. Intelligent Tuning of the Mechanical Impedance of Three-Dimensional Disordered Networks Disordered-Network Mechanical Materials (DNMM), comprised of random arrangements of bonds and nodes, have emerged as mechanical metamaterials with the potential for achieving fine control over the elastic properties of open-cell materials. Recent computational studies have demonstrated this control whereby an extremely high degree of mechanical tunability can be achieved in disordered networks via a selective bond removal process called pruning. In this study, we experimentally demonstrate how pruning of a disordered network alters its macroscopic dynamic mechanical response and its capacity to mitigate impact. Linear impact studies with velocities ranging from 0.1 m/s to 1.5 m/s were performed on 3D printed pruned and unpruned networks comprised of materials spanning a range of stiffness. High-speed videography was used to quantify the changes in elastic constants and energy absorbed as a function of the network structure and the intrinsic material properties. Our results demonstrate that pruning significantly enhances the medium rate ($10^1$ s$^{-1}$-$10^2$ s$^{-1}$) mechanical response of disordered network metamaterials and provides an alternative route for designing materials with tailored impact mitigating properties.

An impact mitigation system can be considered as a protective structure (e.g., armor or helmet) coupled to a delicate target (e.g. brain). It can be simplified to a one-dimensional spring-mass system (FIG. 15) with $m_m$, $k_m$ corresponding to the combined mass and stiffness of the impact mitigator and supporting structure (i.e. skull, neck). The parameters $m_t$ and $k_t$ correspond to the mass and stiffness of the delicate target. When a time-dependent force (P(t)) is applied to $m_m$, it propagates to $m_t$ at a rate determined by $k_m$ and $k_t$. To mitigate this impact, both the acceleration of $m_t$ and the magnitude of the transferred pressure wave need to be minimized.

Different materials requirements determine the reduction of these two dynamic effects. Mitigating the changes in acceleration in a time interval $\Delta t = t_2 - t_1$ requires a reduction in the transmitted impulse ($I_t$) relative to the incident impulse ($I_i$), $$I_t = \int_{t_1}^{t_2} P(t)dt \quad (1)$$

The ratio of transmitted to incident impulse can be related in terms of the ratio of the mass of the delicate object to the mass of the impact mitigator as $$\frac{I_t}{I_i} = \frac{2(m_t/m_m)}{(m_t/m_m)+1} \quad (2)$$

Therefore, Eq. (2) suggests that $m_m \gg m_t$ to effectively reduce the transmitted impulse.

To mitigate the pressure wave, the transmitted force ($P_t$) needs to be minimized relative to the incident force ($P_i$). The figure of merit for minimizing $P_t/P_i$ is the specific acoustic impedance (z), which is a measure of the resistance to mechanical deformation when subjected to a dynamic force. This parameter is a function of the Young's modulus (E) and the mass density of the material ($\rho$) for an isotropic material, $$z = \sqrt{E\rho}. \quad (3)$$

If we consider employing an impact mitigating material system consisting of material A layered on top of material B, the ratio of transmitted to incident force can be written as a function of z of the respective materials, $$\frac{P_t}{P_i} = \frac{2z_B}{z_A + z_B} \quad (4)$$

Eq. (4) indicates that $z_B \ll z_A$ in order to reduce the transmitted pressure wave. It is evident from Eq. (3) that polymeric foams are excellent materials for impact mitigation. Their low densities and relatively low elastic constants minimize the transmission of the pressure wave amplitude when coupled to a second material with a higher z. Thus, polymeric foams are widely used for impact mitigation applications ranging from the aerospace industry to footwear, personal protection and product packaging. Although the mechanical and structural diversity of polymeric materials allows for a theoretically wide parameter space for the design of polymeric foams, actual control over these physical properties often requires radical changes in the polymerization and crosslinking chemistries, which are limited by traditional manufacturing techniques.

There has been a drive towards the design of periodic metamaterials for impact mitigation applications. Unfortunately, their structural symmetry limits the extent of strain or stress localization and range of tunability in extrinsic materials properties. Additionally, most of the studies on mechanical metamaterials focus on maximizing the energy absorption capacity of an impact but they have not been designed for transmitted force reduction.

On the other hand, an aperiodic mechanical metamaterial shows significantly different mechanical behavior. The response of each material point to a global deformation can vary drastically relative to a neighboring one. This facilitates strain localization since bonds experiencing larger stresses are more likely to fail first. When a bond buckles or breaks, the changes in the global elastic constants depend on the details of the broken bond. This bond-to-bond variation in Disordered-Network Mechanical Metamaterials (DNMM) can be exploited to manipulate their mechanical properties by removal of specific bonds. The computational process that selectively removes bonds from disordered networks is known as pruning. Compared with random bond removal, pruning allows the removal of bonds that contribute the most to E for a given $\rho$. This control is critical in impact mitigation since the materials requirements for reducing impulse and transmitted stress wave are different thus requiring independent control over the density and the Young's modulus of a given material. In this work, we make advantageous use of the mechanical tunability of these computationally generated DNMMs by fabricating these materials using 3D printing and then experimentally studying their mechanical response with dynamic impact experiments.

We selected a model three-dimensional disordered network and subjected it to the computational pruning process to generate a new network with a different set of effective elastic moduli. The structures for both unpruned and pruned networks generated computationally were then converted to a stereolithographic file format that enables them to be realized into actual materials for impact testing. All the DNMM samples were printed using UV-curable 3D printing elastomeric resins (FIG. 15b), which offers access to a wide range of constituent materials. For this study, we focused on fabricating DNMMs using resins with Shore-A scale hardness that vary from approximately 30 (soft) to 70 (stiff). We printed all the DNMM samples with approximate dimensions of $(50 \text{ mm})^3$.

To study the mechanical response of DNMMs under dynamic loading conditions, we performed instrumented linear impact experiments with impact velocities ranging from 0.1 m/s to 1.5 m/s on unpruned and pruned DNMMs (FIG. 15c). High-speed videos were captured during the entire impact test and specific video frames of the tests (FIG. 15c) illustrate the differences in the deformation in the transverse direction between the unpruned-DNMM and the pruned-DNMM. Specifically, the unpruned-DNMM expands laterally more than the pruned-DNMM when compressed thus indicating that the Poisson's ratio ($v = \varepsilon_x/\varepsilon_y$), defined as the incremental change in the transversal ($\varepsilon_x$) versus the axial ($\varepsilon_y$) strain, of the two DNMMs are different.

FIG. 16a shows that v for the unpruned-DNMMs ranges approximately from 0.2 to 0.35 whereas v of the pruned-DNMMs is systematically lower ranging approximately from 0.1 to 0.2. v is not only strain dependent in both samples, but it also shows that the pruned-DNMM displays a higher rate dependence than the unpruned-DNMM. At higher impact velocities, the pruned-DNMM displays a general decrease in the magnitude of v that becomes more pronounced at higher compressive strains. A similar rate-dependent v has been observed in open-cell auxetic polyurethane foams, with the behavior attributed to a combination of buckling of the struts that make up the foam and inertial effects of the mechanical test. We speculate that similar effects can explain the increased rate-dependence of v in pruned-DNMM. Specifically, pruning can increase the effective length of the remaining bonds in the network and, therefore, change the critical conditions when buckling instabilities occur.

The true-stress ($\sigma_{tr}$) versus true-strain ($\varepsilon_{tr}$) curves for unpruned-DNMM and pruned DNMM printed with the Shore-A 30 material are shown in FIG. 16b. At a given impact velocity, there is a significant drop in the stiffness of the network after pruning. This is to be expected due to the reduction in the overall load bearing ability of the network after pruning because bonds and nodes are removed in the pruning process. We also observe an apparent stiffening of the DNMMs with increasing impact velocity. However, this velocity dependent stiffness (FIG. 16c) does not change after the pruning process thus suggesting that this change is a property of the constituent material (i.e. an intrinsic property), and not a result of the change in the macroscopic structure of the network (i.e. an extrinsic property). Based on these results, we attribute the strain stiffening behavior to a combination of the viscoelastic properties of the constituent materials used to 3D print the DNMMs and the inertia of the system, not the structure of the network.

Mitigating the transmitted pressure waves due to impact can be achieved via reduction in the specific acoustic impedance of the materials, which is a function of ρ and E (Eq. 3). The pruning process reduces both the density (ρ), and elastic constants (E, K, μ) since bonds and nodes are intentionally removed from the network, which also leads to an associated change in ν due to its relationship to K and μ. To quantify E of the unpruned and pruned DNMMs, we fit the small-strain region of the stress-strain curves (FIG. 16b) with a linear elastic model. Impact tests were also conducted along the three principal axes for the DNMMs. We observed no significant differences in the stress-strain curves along the principal axes for each network thus indicating that both the unpruned and pruned DNMMs can be assumed to be mechanically isotropic.

FIG. 16d summarizes how E and ρ change as a function upon pruning for all impact velocities, and we find that the E~$ρ^n$ with n≈3.3. This is a remarkable result when comparing it to the scaling of stochastic open cell foams, where n>2. We find a decade reduction in K when comparing the pruned versus the unpruned DNMMs. This result demonstrates that pruning is a rational approach for tuning the extrinsic materials properties of this class of mechanical metamaterials.

Next, we printed the same unpruned and pruned DNMMs using other constituent materials and conducted identical impact tests on them. FIG. 17a shows the results from the impact tests of these networks summarizing the change in E as a function of ρ, impact velocity and different constituent materials (with Shore-A hardness=30, 50 and 70). The effective E increases with increasing impact velocity, and this change is independent of the constituent material or pruning. These results suggest that pruning enables a similar degree of tunability of the elastic constants of the DNMM irrespective of the constituent material. Specifically, we find that switching the print material (from Shore-A hardness 30 to 70) increased the effective E of unpruned-DNMMs from ≈$10^2$ kPa to ≈$10^3$ kPa. Upon pruning, we observe a decade reduction in E for each impact velocity and constituent material. The scaling exponent of elastic modulus with density is again significantly higher (≈3) compared to stochastic open-cell foams. These results show that incorporating disordered architectures into a material via pruning enables control over its elastic properties that is independent of the starting material, which is a characteristic that cannot be achieved in traditional polymeric foam design.

This significant reduction in the effective elastic constants also translates to changes in z. We use Eq. 3 and ρ at $ε_{tr}$=0 to estimate z of the DNMMs (FIG. 17b) to show that the predicted reduction in z for the pruned DNMMs is independent of the intrinsic materials properties of the constituent material. To experimentally demonstrate that pruning changes z of the network, we performed drop mass experiments on the unpruned-DNMM and pruned DNMM samples printed using the Shore-A 30, 50 and 70 materials. For the experiment, a 2 kg mass was dropped from a height of 50 mm and the transmitted force ($P_t$) was measured using a force transducer mounted directly underneath the DNMM. FIG. 18 compares the transmitted force ($P_t$) as a function of the duration of the impact (t) of the unpruned and pruned networks for each of the constituent materials. A comparison of the first impact peaks shows that the pruned-DNMM reduces $P_t$ by approximately 33% to 48% relative to that of the unpruned-DNMM. In addition to effectively reducing the magnitude of the impact, the duration of the impact event is extended, which is consistent with the notion that pruning effectively reduces the elastic constants of the network. This simple experiment demonstrates that pruning is a promising strategy for designing the next generation of materials for impact mitigation, with facile tailoring of the important materials properties.

There is a growing need for new materials for impact mitigation. Reaching new levels of high-performing and effective impact mitigating materials require novel design concepts that enable development of materials that are scalable with easily tailorable material properties amenable to a wide variety of applications. The design herein for metamaterials based on disordered networks, combined with additive fabrication, provides materials-by-design approach for achieving this goal. This Example provides the mechanical response of three-dimensional disordered-network metamaterials under dynamic impact loading conditions. Experimental results demonstrate computational pruning of three-dimensional disordered networks provides a rational and flexible route to designing mechanical metamaterials with highly tunable elastic modulus and ultimate mass density. Pruning controls specific acoustic impedance of the disordered network, which is a material property in the design of material for protective structures relevant to optimal blast or impact mitigation.

Disordered Networks Computational Details. The pruning procedure selectively removes bonds that result in the smallest reduction in the shear modulus, μ. Moreover, in jammed networks, the change in $μ_i$ resulting from the removal of a bond, $μ_i$, is largely independent from the change in K resulting from removing the same bond, $K_i$. At each step in the pruning process, $μ_i$ is calculated for each bond in the network, and the bond with the smallest value is pruned. 12.6% of nodes are removed during the pruning process, and the coordination number is reduced from 9.1 to 3.9.

Bond compressive modulus is described with a harmonic spring. The system is relaxed at zero temperature before measurements. The elastic constants are measured similarly to techniques used in previous work. To measure components of the shear modulus, the simulation box is deformed in such a way as to result in zero volume change to linear order. Once deformed, the system is relaxed via the Fire algorithm, and the potential energy is measured. Examples of deformations that satisfy this criterion include straining in the x dimension by some positive Δx and straining the y dimension by the negative.

Disordered Networks Printing. In order to create a 3D printable model of the network, we use a python script that creates one bond at a time and merges them together to form the network. Each bond of the network is a cylinder with its diameter ≈0.4 times the average length of the bonds. The unpruned network has ≈2500 bonds and the pruned network has ≈900 bonds. We convert this structure to an .STL file format that can then be 3D printed.

Disordered-network metamaterial samples were printed using a 3D printer using build materials to obtain the Shore-A 30, 50 and 70 harnesses utilized as constitutive materials.

Constant-velocity, displacement-controlled impact tests were performed using a linear impactor. A piston driven by a computer-controlled linear actuator was instrumented with a dynamic force transducer to measure the applied force on the sample during impact. A flat acrylic plate was attached to the end of piston to evenly distribute the compressive load across (lateral dimension ≈$(100 \text{ mm})^2$) the surface of the sample. Sample deformation was captured using a high-speed camera. The impactor plate started from rest at a height of 10 cm above the sample surface to allow the linear actuator to accelerate to the pre-set constant velocity before impact. The impactor moved with a constant velocity during impact until the pre-set displacement was reached, at which point it stopped.

Edge-detection software was used to measure the changes in height ($\varepsilon_{axial}$) and average width ($\varepsilon_{transversal}$) of DNMM samples during the linear impact experiments. The true strain was then calculated following the definition $\varepsilon_{tr}=\ln(1+\varepsilon_{axial})$. Impact force ($P_t$) was measured by a dynamic force transducer during impact. True stress, $\sigma_{tr}$, was estimated using the average width, w, at each strain to estimate the sample cross-sectional area in $\sigma_{tr}=P_t/w^2$.

A 2-kg instrumented drop mass was dropped from a height of 50 mm onto the DNMM samples. The transmitted force was measured with force transducer plate located under the sample. The data was recorded at 1 kHz by the force transducer and 2 kHz by the instrumented drop mass.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Optional or optionally means that the subsequently described event or circumstance can or cannot occur, and that the description includes instances where the event occurs and instances where it does not. As used herein, combination is inclusive of blends, mixtures, alloys, reaction products, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms a and an and the and similar referents in the context of describing the invention (especially in the context of the following claims) are to be construed to cover both the singular and the plural, unless otherwise indicated herein or clearly contradicted by context. Or means and/or. It can further be noted that the terms first, second, primary, secondary, and the like herein do not denote any order, quantity, or importance, but rather are used to distinguish one element from another. The modifier about used in connection with a quantity is inclusive of the stated value and has the meaning dictated by the context (e.g., it includes the degree of error associated with measurement of the quantity). The conjunction or is used to link objects of a list or alternatives and is not disjunctive; rather the elements can be used separately or can be combined under appropriate circumstances.

What is claimed is:

1. A method of operating a manufacturing machine for manufactured article with aid of an inverse design machine, comprising:

providing the inverse design machine with a primary structure for a manufactured article and with impact-mitigating properties for the manufacturing machine, the primary structure comprising a plurality of structural members arranged in the primary structure that collectively provide primary properties to the manufactured article and that comprise a primary shear modulus and a primary bulk modulus that provide a primary torsional rigidity and a primary compression rigidity of the manufactured article being made by the manufactured article; and the impact-mitigating properties comprising an impact-mitigating shear modulus and an impact-mitigating bulk modulus that provide an impact-mitigating torsional rigidity and an impact-mitigating compression rigidity for the manufactured article being made by the manufacturing machine, such that the impact-mitigating properties provide the manufactured article with greater structural impact mitigation than the primary properties;

receiving the primary structure from a primary designer;

initiating a point-by-point analysis on the primary structure in the inverse design machine;

determining the primary properties of the primary structure with a primary structure analyzer of the inverse design machine;

receiving, by a structure adjuster of the inverse design machine, the primary properties from the primary structure analyzer and the impact-mitigating properties from a structural property manager of the inverse design machine;

adjusting, by the structure adjuster, the structural members in the primary structure until the structural members collectively conform to the impact-mitigating properties such that the primary structure is structurally modified into a designer impact-mitigating architectured isotropic structure that comprises the impact-mitigating properties;

controlling the operation manufacturing machine in accordance with the designer impact-mitigating architectured isotropic structure by the inverse design machine; and forming, by the manufacturing machine under control of the designer impact-mitigating architectured isotropic structure from the inverse design machine, the manufactured article that comprises the designer impact-mitigating architectured isotropic structure instead of the primary structure.

2. The method of claim 1, wherein the manufactured article comprises a disordered-network mechanical material that comprises bonds and nodes, and the primary structure provides a three-dimensional reticulated structure of nodes interconnected by bonds with interstitial spaces separating proximate nodes interconnected with bonds in the disordered-network mechanical material.

3. The method of claim 2, wherein adjusting the structural members in the primary structure comprises structural pruning of the disordered-network mechanical material.

4. The method of claim 3, wherein adjusting the structural members in the primary structure further comprises global node position optimization of the disordered-network mechanical material to produce the designer impact-mitigating architectured isotropic structure.

5. The method of claim 1, wherein forming the manufactured article comprises three-dimensional printing the manufactured article from the designer impact-mitigating architectured isotropic structure provided by the inverse design machine.

6. The method of claim 5, wherein the manufactured article comprises a polymer that is printed by the manufacturing machine.

7. The method of claim 6, wherein the manufacturing machine comprises a three-dimensional printer.

8. A method of operating a manufacturing machine for manufactured article with aid of an inverse design machine, comprising:

provSeeding the inverse design machine with a primary structure for a manufactured article and with impact-mitigating properties for the manufacturing machine, the primary structure comprising a plurality of structural members arranged in the primary structure that collectively provide primary properties to the manufactured article and that comprise a primary shear modulus and a primary bulk modulus that provide a primary torsional rigidity and a primary compression rigidity of the manufactured article being made by the manufactured article; and the impact-mitigating properties comprising an impact-mitigating shear modulus and an impact-mitigating bulk modulus that provide an impact-mitigating torsional rigidity and an impact-mitigating compression rigidity for the manufactured article being made by the manufacturing machine, such that the impact-mitigating properties provide the manufactured article with greater structural impact mitigation than the primary properties;

receiving the primary structure from a primary designer;

initiating a point-by-point analysis on the primary structure in the inverse design machine;

determining the primary properties of the primary structure with a primary structure analyzer of the inverse design machine;

receiving, by a structure adjuster of the inverse design machine, the primary properties from the primary structure analyzer and the impact-mitigating properties from a structural property manager of the inverse design machine;

adjusting, by the structure adjuster, the structural members in the primary structure until the structural members collectively conform to the impact-mitigating properties such that the primary structure is structurally modified into a designer impact-mitigating architectured isotropic structure that comprises the impact-mitigating properties;

controlling the operation manufacturing machine in accordance with the designer impact-mitigating architectured isotropic structure by the inverse design machine;

initiating formation of the manufactured article by controlling a position of a print head of the manufacturing machine under control of the inverse design machine in accord with the designer impact-mitigating architectured isotropic structure;

constantly determining the position of the print head of the manufacturing machine during formation of the manufactured article;

constantly providing the inverse design machine with the position of the print head;

repetitively performing in the inverse design machine, at frequent intervals during formation of the manufactured article, corrections to the position of the printer head based on designer impact-mitigating architectured isotropic structure and to monitor completion of formation of the manufactured article by the manufacturing machine communicating corrections to the position of the printer head from the inverse design machine to the manufacturing machine;

correcting the position of the printer head by the manufacturing machine based on the corrections received from the inverse design machine; and completing formation, by the manufacturing machine under control of the designer impact-mitigating architectured isotropic structure from the inverse design machine, the manufactured article that comprises the designer impact-mitigating architectured isotropic structure instead of the primary structure.

9. The method of claim 8, wherein the manufactured article comprises a disordered-network mechanical material that comprises bonds and nodes, and the primary structure provides a three-dimensional reticulated structure of nodes interconnected by bonds with interstitial spaces separating proximate nodes interconnected with bonds in the disordered-network mechanical material.

10. The method of claim 9, wherein adjusting the structural members in the primary structure comprises structural pruning of the disordered-network mechanical material.

11. The method of claim 10, wherein adjusting the structural members in the primary structure further comprises global node position optimization of the disordered-network mechanical material to produce the designer impact-mitigating architectured isotropic structure.

12. The method of claim 8, wherein forming the manufactured article comprises three-dimensional printing the manufactured article from the designer impact-mitigating architectured isotropic structure provided by the inverse design machine.

13. The method of claim 12, wherein the manufactured article comprises a polymer that is printed by the manufacturing machine.

14. The method of claim 13, wherein the manufacturing machine comprises a three-dimensional printer.

* * * * *